(12) United States Patent
Faccin

(10) Patent No.: US 8,929,265 B2
(45) Date of Patent: *Jan. 6, 2015

(54) SYSTEM AND METHOD FOR ALLOCATING AN ANCHORING POINT FOR A MOBILE TERMINAL

(75) Inventor: Stefano Faccin, Hayward, CA (US)

(73) Assignee: Marvell World Trade Ltd., St. Michael (BB)

( * ) Notice: Subject to any disclaimer, the term of this patent is extended or adjusted under 35 U.S.C. 154(b) by 634 days.

This patent is subject to a terminal disclaimer.

(21) Appl. No.: 13/236,464

(22) Filed: Sep. 19, 2011

(65) Prior Publication Data

US 2012/0008594 A1 Jan. 12, 2012

Related U.S. Application Data

(63) Continuation of application No. 12/167,624, filed on Jul. 3, 2008, now Pat. No. 8,023,492.

(60) Provisional application No. 60/950,440, filed on Jul. 18, 2007, provisional application No. 60/965,355, filed on Aug. 20, 2007.

(51) Int. Cl.
*H04B 7/00* (2006.01)
*H04W 8/02* (2009.01)
(Continued)

(52) U.S. Cl.
CPC ............... *H04W 8/02* (2013.01); *H04W 8/085* (2013.01); *H04W 8/12* (2013.01);
(Continued)

(58) Field of Classification Search
CPC ......... H04W 8/02; H04W 8/085; H04W 8/12; H04W 8/26; H04W 84/12; H04W 88/08; H04W 80/04; H04W 88/06; H04W 84/18; H04W 74/08; H04B 7/00; H04L 2012/5608

USPC ............. 370/389, 310.2, 328, 331, 338, 349, 370/395.52
See application file for complete search history.

(56) References Cited

U.S. PATENT DOCUMENTS 6,430,698 B1 8/2002 Khalil et al.
6,751,672 B1 6/2004 Khalil et al.
(Continued)

FOREIGN PATENT DOCUMENTS

WO WO 2004/014027 2/2004
WO WO-2006095269 A1 9/2006

OTHER PUBLICATIONS

"Mobile Plv4 Dynamic Home Agent Assignment Framework"; Kulkarni Alpesh Patel Kent Leung; Cisco Systems Inc IETF S:<draft-kulkarni-mobileip-dynamic-assignment-O1.txt>; draft-kulkarni-mobileip-dynamic-assignment-O1.txt Standrad-Working-Draft, Internet Engineering Task Force, IETF, CH, No. 1, Jun. 30, 2003, XP015004046 ISSN: 0000-0004 p. 1, last paragraph p. 3, paragraph 2 p. 6.

(Continued)

*Primary Examiner* — Brenda H Pham

(57) ABSTRACT

A first network configured to connect a terminal to a home network during a time that the terminal is roaming within the first network. The first network includes a plurality of attachment points, wherein a first attachment point is configured to receive an attach request from the terminal, and wherein the attach request includes a request from the terminal for an IP address from an anchoring point within the home network. The first network further includes an Authentication/Authorization/Accounting server proxy configured to determine whether the terminal is authorized to attach to the first attachment point, wherein in response to the terminal being authorized to attach to the first attachment point, i) a first tunnel is created between the first attachment point and a second attachment point, and ii) a second tunnel is created between the second attachment point and the anchoring point within the home network.

8 Claims, 15 Drawing Sheets

(51) Int. Cl.

| | |
|---|---|
| H04W 8/08 | (2009.01) |
| H04W 8/12 | (2009.01) |
| H04W 8/26 | (2009.01) |
| H04W 48/16 | (2009.01) |
| H04W 80/04 | (2009.01) |
| H04W 88/06 | (2009.01) |

(52) U.S. Cl.
CPC ................. *H04W 8/26* (2013.01); *H04W 48/16* (2013.01); *H04W 80/04* (2013.01); *H04W 80/045* (2013.01); *H04W 88/06* (2013.01); *H04W 69/18* (2013.01)
USPC ....................................... 370/310.2; 370/328

(56) References Cited

U.S. PATENT DOCUMENTS

| | | | |
|---|---|---|---|
| 6,850,532 | B2 | 2/2005 | Thubert et al. |
| 7,167,466 | B2 | 1/2007 | Chowdhury et al. |
| 7,796,616 | B2 | 9/2010 | Kim |
| 7,912,035 | B1* | 3/2011 | Leung et al. .................. 370/351 |
| 2006/0018291 | A1 | 1/2006 | Patel et al. |
| 2006/0029014 | A1 | 2/2006 | Maturi |
| 2006/0140150 | A1* | 6/2006 | Olvera-Hernandez et al. ............................. 370/331 |

OTHER PUBLICATIONS

"Interactions between PMIPv6 and MIPv6: scenarios and related issues; draft-giaretta-netlmm-mip-interactions-01.txt" Giaretta G et al. IETF Standard-Working-Draft, Internet Engineering Task Force, IETF, CH, No. 1, Jul. 6, 2007, XP015050956 ISSN: 0000-0004 p. 1, last paragraph p. 3, paragraphs 3, 4 page 5, paragraph 1 p. 11, paragraph 3.

Invitation to Pay Additional Fees and, where Applicable, Protest Fee, dated Jan. 22, 2009, for corresponding International Application No. PCT/US2008/070468.

ANSI/IEEE Std 802.11, 1999 Edition; Information technology—Telecommunication and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 2999; 91 pages.

IEEE Std 802.11b-1999 (Supplement to IEEE Std 802.11-1999 Edition); Supplement to IEEE Standard for Information technology—Telecommuncations and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2999 IEEE-SA Standards Board; 96 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003]; IEEE Standard for Inforamtion technology—Telecommunications and information exchange between systems—Local and metropolitan area networks—Specific requirements; Part 11: Wireless LAN Medium Access Control (MAC) and Physical Layer (PHY) Specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P802.20™ V14; Jul. 16, 2004; Draft 802.20 Permanent Docuemtn; System Requirements for IEEE 802.20 Mobile Broadband Wireless Access Systems—Version 14; 24 pages.

Mobile IPv6 bootstraping in split scenario; draft-ietf-mip6-boostrapping-split-07; G. Giaretta, Ed., Qualcomm; J. Kempf, DoCoMo Labs USA; V. DeVarapalli, Ed. Azaire Networks; Jul. 22, 2007; 28 pages.

Neighbor Discovery for IP Version 6 (IPv6); rfc2461.txt; T. Nareten, IBM; E. Nordmark, Sun Mircrosystems; W. Simpson, Daydreamer; Dec. 1998; 93 pages.

IPv6 Stateless Address Autoconfigureation; rfc2462.txt; S. Thomson, Bellcore; T. Narten, IBM; Dec. 1998; 25 pages.

Dynamic Host Configuration Protocol (DHCP) Leasequery; rfc4388.txt; R. Woundy, Comcast Cable.; K. Kinnear, Cisco Systems; Feb. 2006; 27 pages.

IPv6 Host-to-Router Load Sharing; rfc4311.txt; R. Hinden, Nokia; D. Thaler, Microsoft; Nov. 2005; 5 pages.

DHCP Options and BOOTP Vendor Extensions; rfc2132.txt; S. Alexander, Silicon Graphics, Inc.; R. Droms, Bucknel University; Mar. 1997; 34 pages.

Extended European Search Report for European Application No. 12007141.0-1853/2549779 dated Jul. 24, 2014; 9 pages.

* cited by examiner

SYSTEM AND METHOD FOR ALLOCATING AN ANCHORING POINT FOR A MOBILE TERMINAL

CROSS-REFERENCE TO RELATED APPLICATIONS

This present disclosure is a continuation of U.S. application Ser. No. 12/167,624, filed on Jul. 3, 2008, which claims priority under 35 U.S.C. §119(e) to U.S. Provisional Application No. 60/950,440, filed on Jul. 18, 2007 and U.S. Provisional Application No. 60/965,355, filed on Aug. 20, 2007.

FIELD

The present disclosure relates to network systems and more particularly to mobile terminal communications within network systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless network system is presented. A home network 102 receives packets from and sends packets to a packet data network (PDN) 104 that may include a distributed communications system, such as the Internet. A wireless terminal 106 wirelessly connects to the home network 102. For example, the wireless terminal 106 may be a mobile phone, and the home network 102 may be a cellular network of a mobile phone operator. The wireless terminal 106 is configured to work with the home network 102 and may be unable connect to networks of other carriers. In various implementations, the wireless terminal 106 may be able to view content from the PDN 104 via the home network 102. The home network 102 may also interconnect with various other networks that correspond to respective service providers, including service providers in other countries.

Referring now to FIG. 2, a functional block diagram of a wireless network system offering mobility is presented. The home network 102 is connected to one or more visited networks 110. For example, FIG. 2 depicts three visited networks 110-1, 110-2 and 110-3. In various implementations, the visited networks 110 may be the various other networks discussed above.

A mobile wireless terminal 120 includes mobility features and may thus implement host-based mobility. The mobility features allow the mobile wireless terminal 120 to communicate with the visited networks 110. For example, in FIG. 2, the mobile wireless terminal 120 has established a wireless connection to the visited network 110-1. The mobile wireless terminal 120 includes code and data used to communicate with the home network 102 via the visited network 110-1. For example, the mobile wireless terminal 120 may implement a Common Management Information Protocol (CMIP). In this way, the mobile wireless terminal 120 can interface with the home network 102 even when connected to one of the visited networks 110.

Referring now to FIG. 3, a functional block diagram depicts a wireless network system that provides proxy mobility to the wireless terminal 106. A home network 150 communicates with visited networks 160-1, 160-2, and 160-3. The visited networks 160 provide transparent mobility to wireless terminals, such as the wireless terminal 106, that have not been updated to include mobility functionality.

When the wireless terminal 106 attempts to establish a link with the visited network 160-1, the visited network 160-1 determines the network to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 may therefore be oblivious to the fact that it is connected to the visited network 160-1 instead of to the home network 150.

Referring now to FIG. 4, a more detailed functional block diagram of an implementation of proxy mobility is presented. Proxy mobility may also be referred to as network-based mobility because the network provides mobility to a terminal that may not have built-in mobility. In an Internet Protocol (IP) network, proxy mobility may be referred to as proxy mobile IP (PMIP). The home network 150 includes a home agent (HA) 202. The HA 202 establishes the logical location of the wireless terminal 106. Packets destined for the wireless terminal 106 are first sent to the HA 202, while packets from the wireless terminal 106 will appear to originate from the HA 202.

The wireless terminal 106 may establish a connection to an attachment point 206-1 within the visited network 160-1. In various implementations, additional attachment points, such as attachment points 206-2 and 206-3, may be present. The attachment points 206 may communicate with other networks, including the home network 150, via a gateway 210.

Referring now to FIG. 5, a timeline of steps performed when the wireless terminal 106 connects to the visited network 160-1 is presented. First, the wireless terminal 106 performs access and authentication with the attachment point 206-1. This may include communicating with an Access, Authentication, and Accounting (AAA) server. Upon authentication, the wireless terminal 106 attempts to attach to the attachment point 206-1.

The AAA server may use an identifier of the wireless terminal 106, such as a network address identifier, that uniquely identifies the wireless terminal 106. The attachment request requests an IP address from the attachment point 206-1. The attachment point 206-1 determines the appropriate HA for the wireless terminal 106. This information may be supplied by the wireless terminal 106 and/or may be supplied by the source of the authentication information.

The attachment point 206-1 then sends a binding update message to the HA 202. The HA 202 allocates an IP address, $IP_1$, to the wireless terminal 106. The address $IP_1$ is used for communications with the wireless terminal 106. When the wireless terminal 106 sends a packet, that packet will appear to originate from the HA 202 with a source address of $IP_1$. In addition, packets destined for the wireless terminal 106 are sent to the HA 202 with a destination of $IP_1$. In other words, $IP_1$ is used for packet exchanges while an address of the HA 202 is not used.

The HA 202 sends a binding acknowledgement message including $IP_1$ to the attachment point 206-1. A tunnel is then set up between the attachment point 206-1 and the HA 202 for transmission of packets to and from the wireless terminal 106. The attachment point 206-1 then assigns $IP_1$ to the wireless terminal 106. In this process, the wireless terminal 106 has requested an IP address from the attachment point 206-1 and has received one. The wireless terminal 106 may not be aware that it is connected to the visited network 160 or the home network 150.

Referring now to FIGS. 6 and 7, a packet being sent by the wireless terminal 106 and a packet being sent to the wireless terminal 106, respectively, are graphically depicted. Referring now to FIG. 6, a packet 242 is transmitted to the wireless terminal 106. The source of the packet 242 is $IP_1$, the IP address assigned to the wireless terminal 106. The destination of the packet 242 is the IP address, denoted $IP_{dest}$, to which the wireless terminal 106 is sending the packet 242. $IP_{dest}$ corresponds to a location in the PDN 104. The packet 242 may also include a payload.

The packet 242 is received by the attachment point 206-1. The attachment point 206-1 tunnels the packet 242 to the HA 202. The packet 242 is tunneled by encapsulating it within an encapsulating packet 244. The header and payload of the packet 242 is placed in the payload of the encapsulating packet 244. The encapsulating packet 242 has a source address of the attachment point 206-1, $IP_{AP}$, and a destination address of the HA 202, $IP_{HA}$.

When the HA 202 receives the encapsulating packet 244, the HA 202 extracts the original packet 242 from the payload of the encapsulating packet 244. The packet 242 is then routed to the destination indicated by $IP_{dest}$. For example, this may be an address on the PDN 104.

Referring now to FIG. 7, a packet 252 is received by the HA 202 for the wireless terminal 106. The packet 252 has a source address of the sender of the packet 252, designated $IP_{src}$. The destination address of the packet 252 is the address assigned to the wireless terminal 106, $IP_1$. The HA 202 recognizes the destination address of $IP_1$ and tunnels the packet 252 to the attachment point 206-1.

The packet 252 may be tunneled by encapsulating it within the payload of an encapsulating packet 254. The source address of the encapsulating packet 254 is the address of the HA 202, $IP_{HA}$. The destination of the encapsulating packet 254 is the address of the attachment point 206-1, $IP_{AP}$. The attachment point 206-1 extracts the packet 252 from the payload of the encapsulating packet 254 and forwards the packet 252 to the wireless terminal 106.

SUMMARY

A mobile terminal includes an Internet Protocol (IP) address module that requests and receives a first IP address from a home anchoring point within a home network. The first IP address is an address of the home anchoring point. The system also includes a packet module that exchanges packets with the home anchoring point via a first attachment point. The packets include the first IP address.

In other features, the IP address module requests and receives the first IP address when the mobile terminal is establishing connectivity with the home network. The system also includes a mobility management module that selects one of host based IP mobility management and network based IP mobility management for the mobile terminal. The IP mobility management includes at least one of a Common Management Information Protocol (CMIP), a proxy mobile IP (PMIP) and General Packet Radio Service Tunneling Protocol (GTP).

In other features, the packet module exchanges packets with the home anchoring point via a second attachment point when the mobile terminal is roaming within a range of the second attachment point. The mobility management module selects the host based IP mobility for communicating with the home anchoring point via the second attachment point. The first IP address corresponds to a public IP address for the home anchoring point. One of the packets further includes a second IP address that includes an IP source address for payload data of the one of the packets.

In other features, the IP source address indicates a location within a packet data network from which the payload data originated. The system also includes an access module that requests connection to the first attachment point. The packet module encapsulates outgoing ones of the packets with the first IP address, payload data, and a second IP address that identifies a destination within a packet data network for the payload data. The packet module encapsulates outgoing ones of the packets with a source IP address for the mobile terminal. The mobile terminal selects one of a plurality of types of mobility management.

In other features, the system includes the home anchoring point. The home anchoring point selectively provides the first IP address based on the selected one of the plurality of types of mobility management. The system also includes a visited network. The mobile terminal requests the connection to the first attachment point when roaming in the visited network. The mobile terminal requests the connection to the first attachment point when roaming in one of the home network.

In other features, a home anchoring point is located within a home network. The home anchoring point includes a public address module that selectively provides a public address for the home anchoring point in response to selection of the home anchoring point by a device of the home network. The selection is based on a private address for the home anchoring point. The public address is requested by and is directly addressable by a mobile terminal. The system also includes a packet module that exchanges packets with the mobile terminal. The packets include the public address. At least one of the public and private addresses includes an Internet protocol (IP) address.

In other features, the system includes a mobility management module that determines whether the home anchoring point supports a request for mobility from the mobile terminal. The request for mobility includes a request to use one of a Common Management Information Protocol (CMIP), a proxy mobile IP (PMIP) and General Packet Radio Service Tunneling Protocol (GTP). One of the packets further includes a second address that includes an IP source address for payload data of the one of the packets. The IP source address indicates a location within a packet data network from which the payload data originated.

In other features, the packet module encapsulates outgoing ones of the packets with the first address, payload data, and a second address that identifies a source within a packet data network for the payload data. The packet module encapsulates outgoing ones of the packets with a third address that corresponds to the mobile terminal.

In other features, a method for operating a mobile terminal includes requesting a first Internet protocol (IP) address from a home anchoring point within a home network. The method also includes receiving the first IP address from the home anchoring point. The first IP address is an address of the home anchoring point. The method also includes exchanging packets with the home anchoring point via a first attachment point. The packets include the first IP address.

In other features, the method includes requesting and receiving the first IP address when the mobile terminal is establishing connectivity with the home network. The method also includes selecting one of host based IP mobility management and network based IP mobility management for the mobile terminal. The IP mobility management includes at least one of a Common Management Information Protocol (CMIP), a proxy mobile IP (PMIP) and General Packet Radio Service Tunneling Protocol (GTP). The method also includes exchanging packets with the home anchoring point via a second attachment point when the mobile terminal is roaming within a range of the second attachment point.

In other features, the method includes selecting the host based IP mobility for communicating with the home anchoring point via the second attachment point. The first IP address corresponds to a public IP address for the home anchoring point. One of the packets further includes a second IP address that includes an IP source address for payload data of the one of the packets. The IP source address indicates a location within a packet data network from which the payload data originated.

In other features, the method includes requesting connection to the first attachment point. The method also includes encapsulating outgoing ones of the packets with the first IP address, payload data, and a second IP address that identifies a destination within a packet data network for the payload data. The method also includes encapsulating outgoing ones of the packets with a source IP address for the mobile terminal. The method also includes selecting one of a plurality of types of mobility management. The method also includes selectively providing the first IP address based on the selected one of the plurality of types of mobility management.

In other features, a method for operating a home anchoring point within a home network is disclosed. The method includes selectively providing a public address for the home anchoring point in response to selection of the home anchoring point by a device of the home network. The selection is based on a private address for the home anchoring point. The public address is requested by and is directly addressable by a mobile terminal. The method also includes exchanging packets with the mobile terminal. The packets include the public address. At least one of the public and private addresses includes an Internet protocol (IP) address.

In other features, the method also includes determining whether the home anchoring point supports a request for mobility from the mobile terminal. The request for mobility includes a request to use one of a Common Management Information Protocol (CMIP), a proxy mobile IP (PMIP) and General Packet Radio Service Tunneling Protocol (GTP). One of the packets further includes a second address that includes an IP source address for payload data of the one of the packets.

In other features, the IP source address indicates a location within a packet data network from which the payload data originated. The method also includes encapsulating outgoing ones of the packets with the first address, payload data, and a second address that identifies a source within a packet data network for the payload data. The method also includes encapsulating outgoing ones of the packets with a third address that corresponds to the mobile terminal.

In other features, a mobile terminal includes Internet Protocol (IP) address means for requesting and receiving a first IP address from home anchoring point means for anchoring within a home network. The first IP address is an address of the home anchoring point means. The system also includes packet means for exchanging packets with the home anchoring point means via first attachment point means for attaching. The packets include the first IP address.

In other features, the IP address means requests and receives the first IP address when the mobile terminal is establishing connectivity with the home network. The system also includes mobility management means for selecting one of host based IP mobility management and network based IP mobility management for the mobile terminal. The IP mobility management includes at least one of a Common Management Information Protocol (CMIP), a proxy mobile IP (PMIP) and General Packet Radio Service Tunneling Protocol (GTP).

In other features, the packet means exchanges packets with the home anchoring point means via second attachment point means for attaching when the mobile terminal is roaming within a range of the second attachment point means. The mobility management means selects the host based IP mobility for communicating with the home anchoring point means via the second attachment point means. The first IP address corresponds to a public IP address for the home anchoring point means. One of the packets further includes a second IP address that includes an IP source address for payload data of the one of the packets.

In other features, the IP source address indicates a location within a packet data network from which the payload data originated. The system also includes access means for requesting connection to the first attachment point means. The packet means encapsulates outgoing ones of the packets with the first IP address, payload data, and a second IP address that identifies a destination within a packet data network for the payload data. The packet means encapsulates outgoing ones of the packets with a source IP address for the mobile terminal. The mobile terminal selects one of a plurality of types of mobility management.

In other features, the system includes the home anchoring point means. The home anchoring point means selectively provides the first IP address based on the selected one of the plurality of types of mobility management. The system also includes a visited network. The mobile terminal requests the connection to the first attachment point means when roaming in the visited network. The mobile terminal requests the connection to the first attachment point means when roaming in the home network.

In other features, home anchoring point means for anchoring is located within a home network. The home anchoring point means includes public address means for selectively providing a public address for the home anchoring point means in response to selection of the home anchoring point means by a device of the home network. The selection is based on a private address for the home anchoring point means. The public address is requested by and is directly addressable by a mobile terminal. The system also includes packet means for exchanging packets with the mobile terminal. The packets include the public address. At least one of the public and private addresses includes an Internet protocol (IP) address.

In other features, the system includes mobility management means for determining whether the home anchoring point means supports a request for mobility from the mobile terminal. The request for mobility includes a request to use one of a Common Management Information Protocol (CMIP), a proxy mobile IP (PMIP) and General Packet Radio Service Tunneling Protocol (GTP). One of the packets further includes a second address that includes an IP source address for payload data of the one of the packets. The IP source address indicates a location within a packet data network from which the payload data originated.

In other features, the packet means encapsulates outgoing ones of the packets with the first address, payload data, and a second address that identifies a source within a packet data network for the payload data. The packet means encapsulates outgoing ones of the packets with a third address that corresponds to the mobile terminal.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
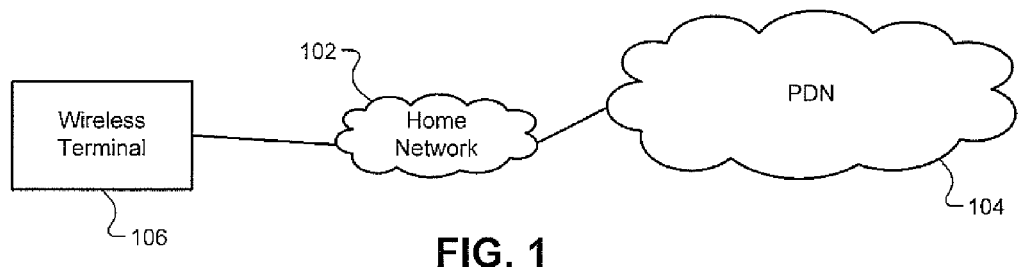
FIGS. 1-3 are functional block diagram of wireless network systems according to the prior art.
Figure 2:
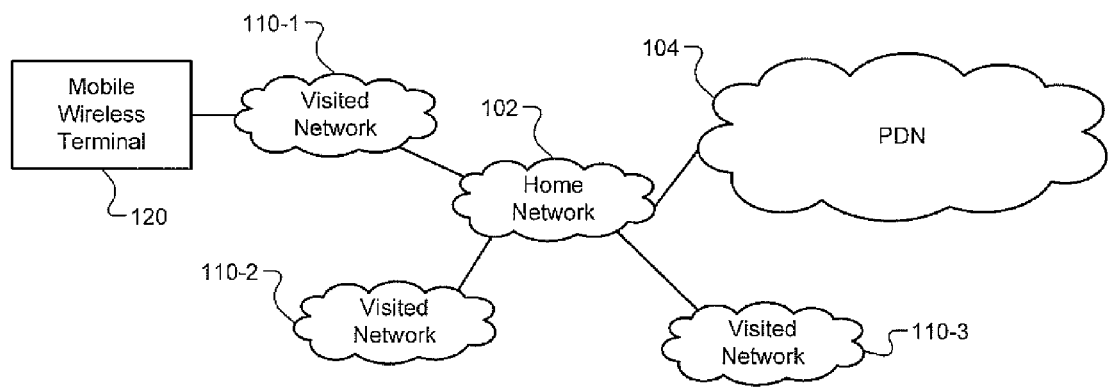
Figure 3:
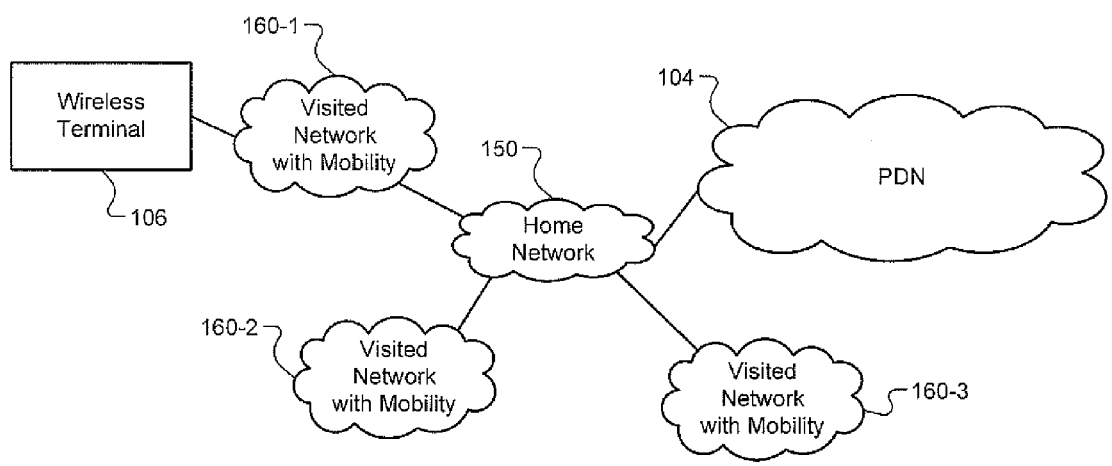
Figure 4:
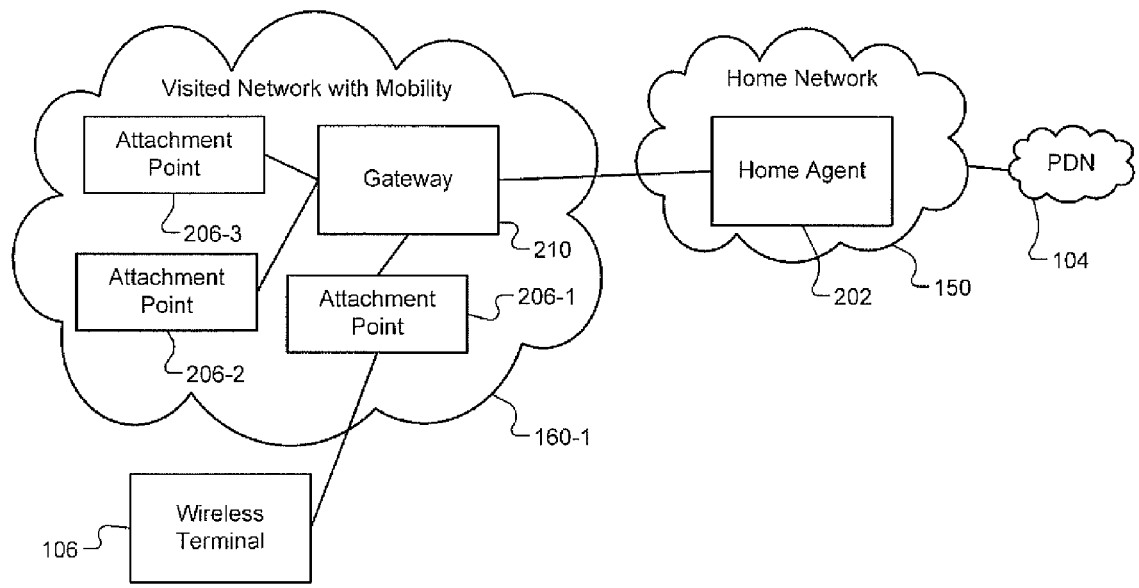
FIG. 4 is a functional block diagram of an implementation of proxy mobility according to the prior art.
Figure 5:
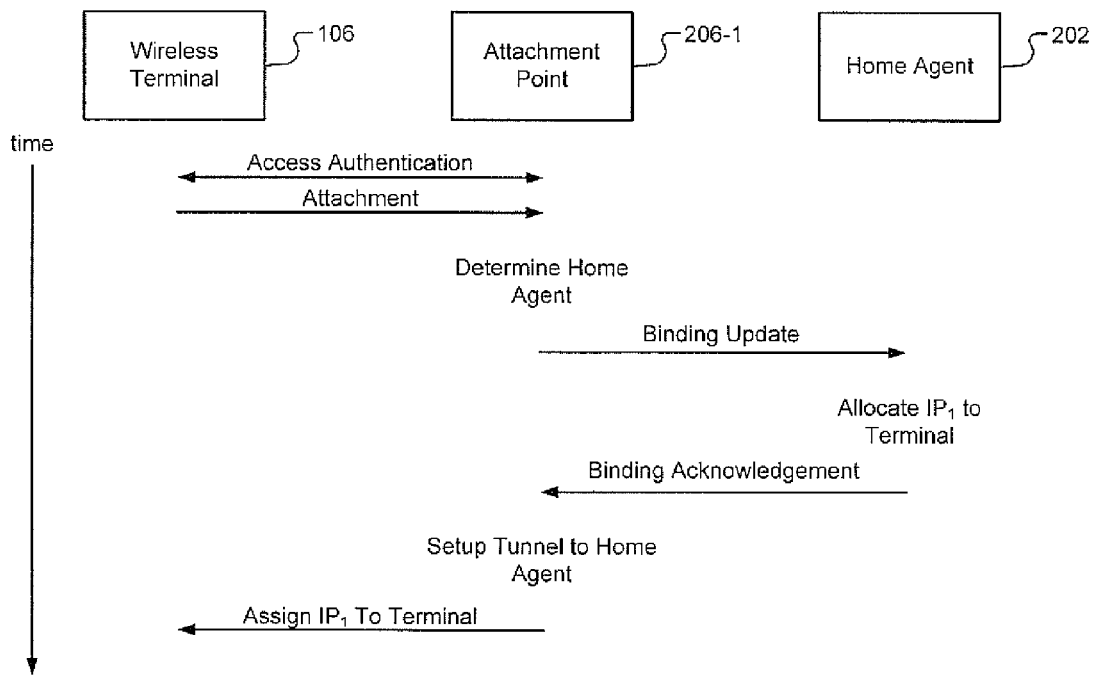
FIG. 5 is a timeline of steps performed when a wireless terminal connects to a visited network according to the prior art.
Figure 6:
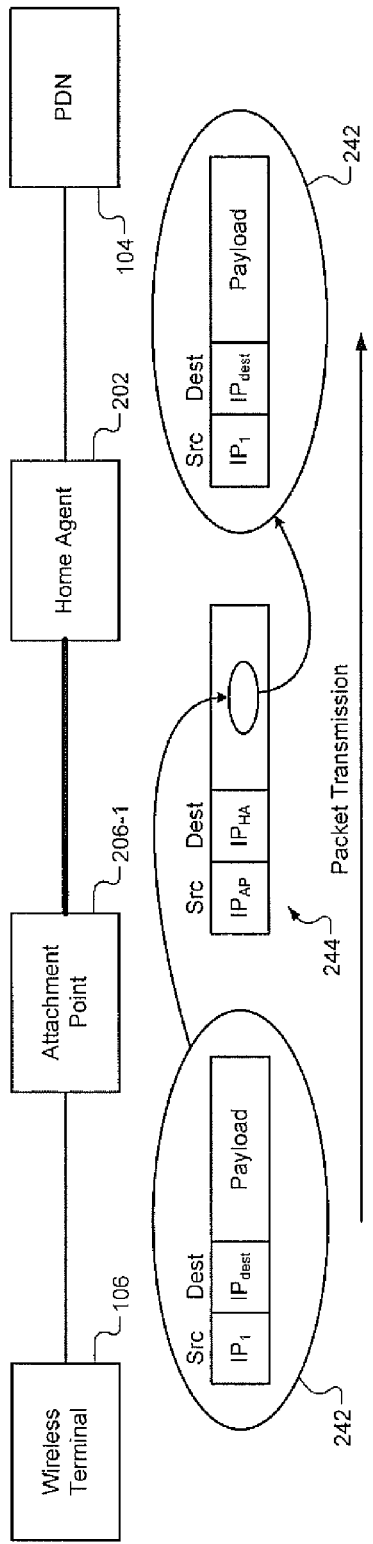
FIGS. 6-7 are graphical depictions of a packet being sent by and sent to a wireless terminal, respectively, according to the prior art.
Figure 7:
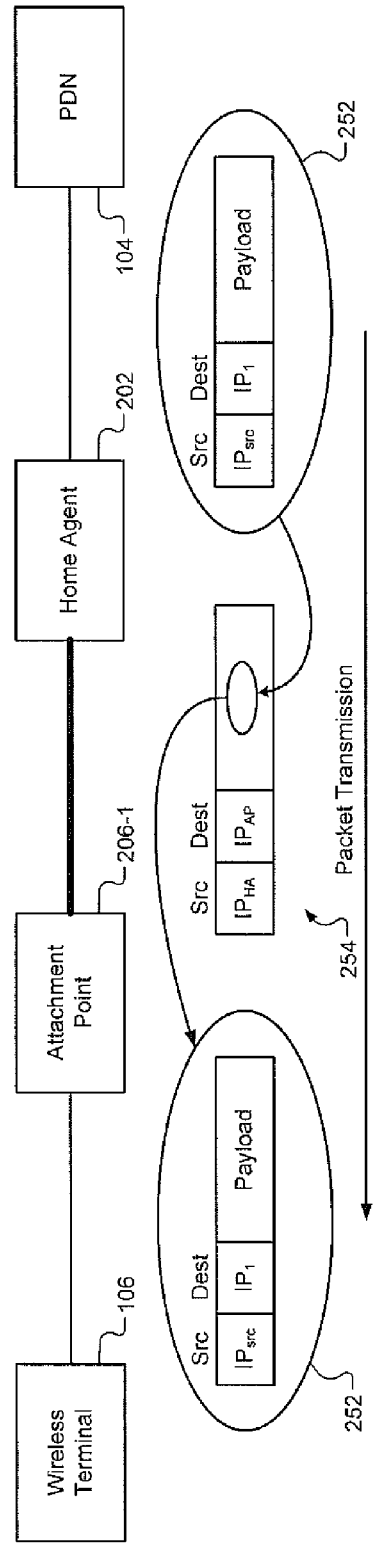

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. The following systems and devices may include $3^{rd}$ Generation Partnership Project (3GPP) system components and comply with 3GPP technical specifications, some of which are stated herein.

According to the present disclosure, a mobile terminal requests an address from an anchoring point that is within a home network. The anchoring point provides the mobile terminal with a public Internet Protocol (IP) address for the anchoring point. A public address is an address that may be directly addressed by a mobile terminal and that may correspond to a specific anchoring point. The mobile terminal may therefore use the public IP address to directly address the anchoring point when roaming between access points of the visited network or access points in other visited networks.

Previously, anchoring points did not provide public addresses to mobile terminals and instead used private address to communicate with various network devices other than terminals. The private addresses were invisible to terminals. Terminals therefore were not aware of the address of the ultimate home anchoring point and instead communicated with the various network devices in order to communicate through the ultimate home anchoring point.

Figure 8:
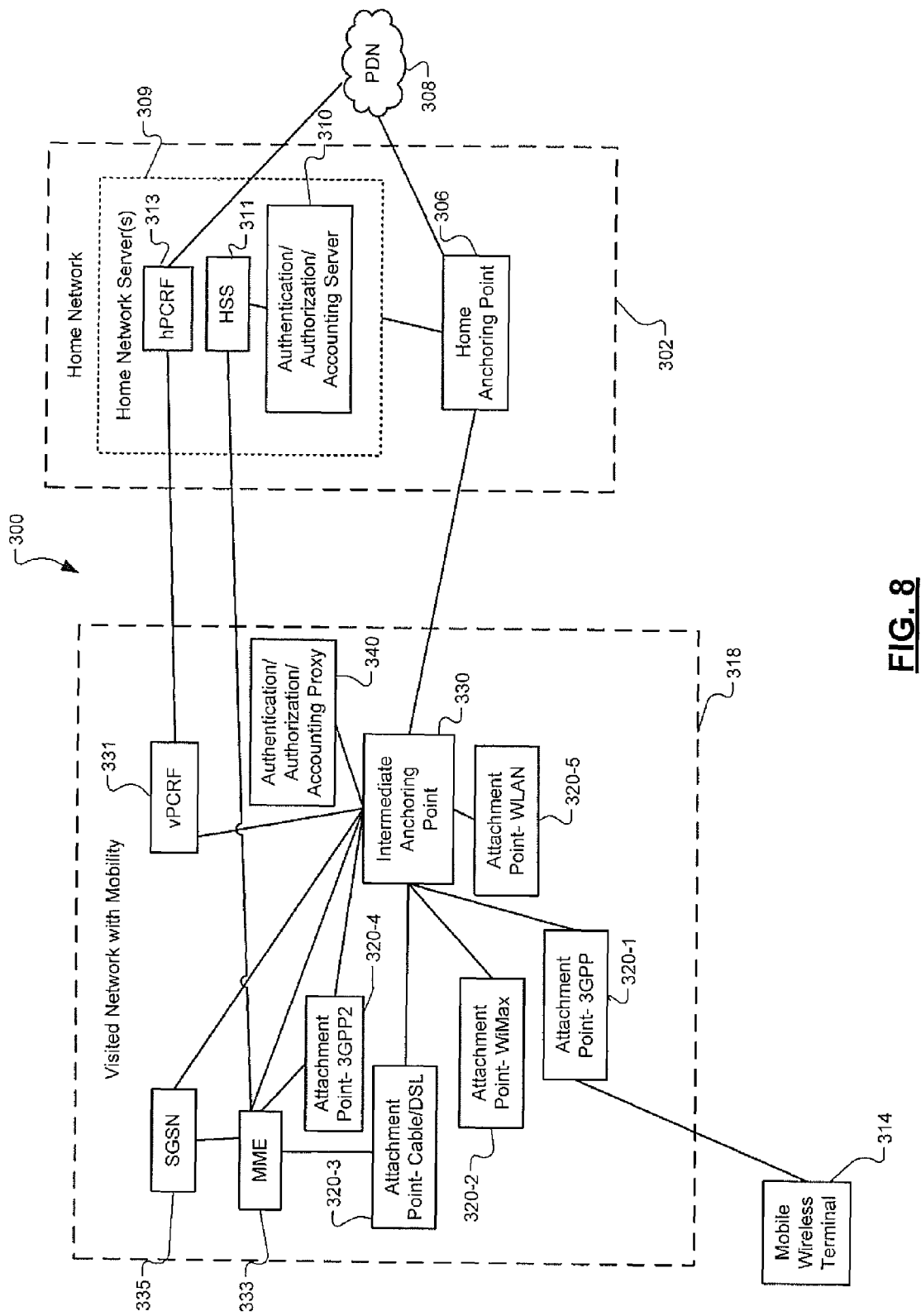
FIG. 8 is a functional block diagram of a network system according to the present disclosure.

Referring now to FIG. 8, a functional block diagram depicts an exemplary implementation of a network system 300 that includes a hierarchical proxy mobility architecture, according to the present disclosure. Alternative embodiments do not require the proxy mobile structure and may merely include communications between the mobile terminal 314 and devices within the home network 302. The home network 302 includes a home anchoring point 306. An example of a home network 302 includes a home public land mobile network (HPLMN) of a 3GPP network system. An example of an anchoring point is a gateway, such as a packet data network (PDN) gateway.

The home anchoring point 306 may communicate with one or more home network servers 309 and a PDN 308 that may include a distributed communications system, such as the Internet. The home anchoring point 306 allows data transfer between the home network 302 and various external IP services of one or more PDNs, such as the PDN 308. Examples of home network servers 309 include an authentication/authorization/accounting (AAA) server 310, a home subscriber server (HSS) 311 and a home policy and changing rules function (hPCRF) device 313.

A terminal 314, which may include a mobile device such as a mobile phone, connects to the home network 302 via a visited network 318 when roaming. An example of a visited network includes a visited public land mobile network (VPLMN) of a 3GPP network system. The visited network 318 includes one or more attachment points 320. For example, five attachment points 320-1, 320-2, 320-3, 320-4, and 320-5 are shown. The attachment points 320 may include any suitable wireless or wired interface that may comply with IEEE standards 802.11, 802.11a, 802.11b, 802.11g, 802.11h, 802.11n, 802.16, and 802.20, which are incorporated herein in their entirety.

For example, the attachment point 320-1 may include a 3GPP interface. The attachment point 320-1 may use the Universal Mobile Telecommunications System (UMTS) and/or a Long Term Evolution (LTE) Radio Access Network (RAN).

For example, the attachment point 320-2 may include a Worldwide interoperability for Microwave Access (WiMAX) interface. For example, the attachment point 320-3 may include a wired interface, such as a cable modem or a Digital Subscriber Line (DSL). For example, the attachment point 320-4 may include a $3^{rd}$ Generation Partnership Project 2 (3GPP2) interface, which may use Code Division Multiple Access 2000 (CDMA2000). For example, the attachment point 320-5 may include a Wireless Local Area Network (WLAN) interface.

The attachment points 320 may communicate with other networks, such as the home network 302, via an intermediate anchoring point 330. The intermediate anchoring point 330 may be, for example, a serving gateway. The visited network 318 may also include a visited policy and changing rules function (vPCRF) device 331. The vPCRF device 331 and the hPCRF device 313 may terminate reference points between network devices, such as reference points associated with each other, the intermediate anchoring point 330, the home anchoring point 306, devices within the PDN 308, etc.

The intermediate anchoring point 330 may also include switching and routing functionality to allow the attachment points 320 to communicate between each other. The intermediate anchoring point 330 may communicate with a mobility management entity (MME) 333, a servicing general packet radio service support node (SGSN) 335, a Radio Access Network (RAN), and the vPCRF device 331. The SGSN 335 may perform MME selection and/or intermediate anchoring point selection. The visited network 318 may include an AAA proxy 340, which connects to the AAA server 310 of the home network 302.

For example, the mobile terminal 314 is shown connected to the attachment point 320-1. When the mobile terminal 314 initiates the connection with the attachment point 320-1, the attachment point 320-1 determines whether the mobile terminal 314 is authorized by querying the AAA proxy 340. The AAA proxy 340 may identify the AAA server 310 based on identification information from the mobile terminal 314, and request authorization information from the AAA server 310.

The AAA proxy 340 may cache this data, such as for a specified period of time or for as long as the mobile terminal 314 is connected to one of the attachment points 320 of the visited network 318. In addition, the AAA server 310 may provide an expiration time for this authorization information. The authorization information may include whether the mobile terminal 314 is authorized to connect to the visited network 318, what services the mobile terminal 314 should be offered, and what quality of service the mobile terminal 314 should be guaranteed.

In various implementations, the AAA proxy 340 may provide the address of the AAA server 310 to the attachment point 320-1, which then queries the AAA server 310 directly. Access and authorization may be provided by any suitable method, including via the HSS 311.

Assuming that the mobile terminal 314 is authorized to attach, a first tunnel is created between the attachment point 320-1 and the intermediate anchoring point 330. A second tunnel is created between the intermediate anchoring point 330 and the home anchoring point 306. If the mobile terminal 314 switches from the attachment point 320-1 to another of the attachment points 320, or to another 3GPP attachment point (not shown), only the first tunnel may be modified. The second tunnel, from the intermediate anchoring point 330 to the home anchoring point 306, may remain unchanged.

Figure 9A:
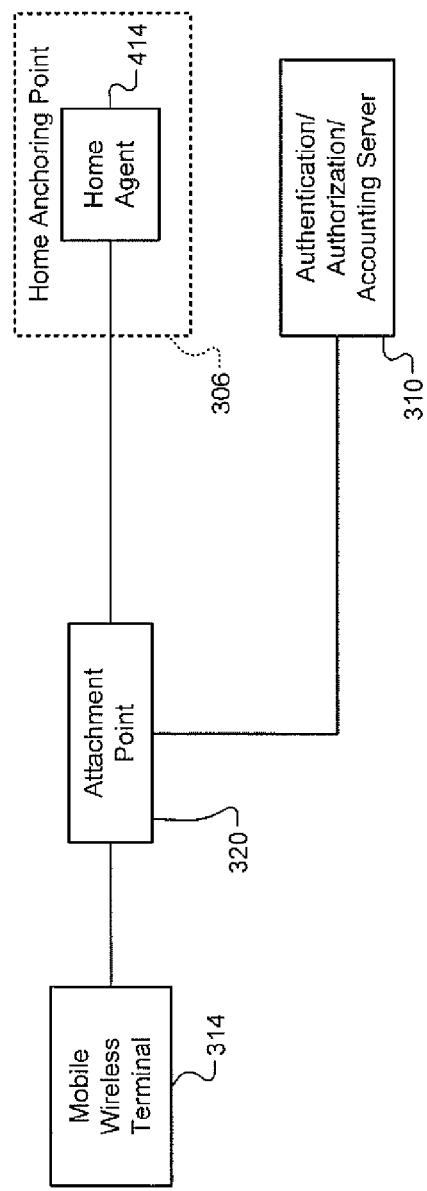
FIG. 9A is a functional block diagram of an exemplary implementation of terminal mobility for a single attachment point according to the present disclosure.

Referring now to FIG. 9A, the mobile terminal 314 initially connects to an attachment point 320, which may be an attachment point in the home or visited networks 302, 318 or in another network that is not a 3GPP based network. At this time, the mobile terminal 314 may also request a public address in order to communicate directly with an anchoring point, such as anchoring point 306 that includes a home agent (HA) 414. The public address may be directly addressed by the mobile terminal 314 and may correspond to a specific home anchoring point. The attachment point 320 receives identification information from the mobile terminal 314. The identification information is sent to the AAA server 310, which returns authentication information to the attachment point 320.

Alternatively, the mobile terminal 314 may also provide a public IP address for a home anchoring point, such as home anchoring point 306, that was previously acquired. The attachment point 320 may recognize that the address corresponds to an anchoring point, such as the home anchoring point 306, and may route communications directly to the home anchoring point 306 without requiring authorization, authentication, etc.

Otherwise, assuming that the mobile terminal 314 is authorized for access, the anchoring point 306 may allocate an IP address, $IP_1$, to the mobile terminal 314. The anchoring point 306 may also allocate a public IP address ($IP_{HA}$) that designates the home anchoring point 306 in response to the request for the public address from the mobile terminal 314.

The mobile terminal 314 may use $IP_{HA}$ to connect with the home anchoring point 306 without requiring authorization, authentication, etc. The address $IP_1$ from the second HA 414 may also be assigned to the mobile terminal 314. In other words, a request from the mobile terminal 314 is carried through the network(s) to the HA 414 using mechanisms for establishing the connectivity between the attachment point 320 and the HA 414. Likewise, the reply from the HA 414 is also carried through the network(s) using the mechanisms for establishing the connectivity between the attachment point 320 and the HA 414.

Figure 9B:
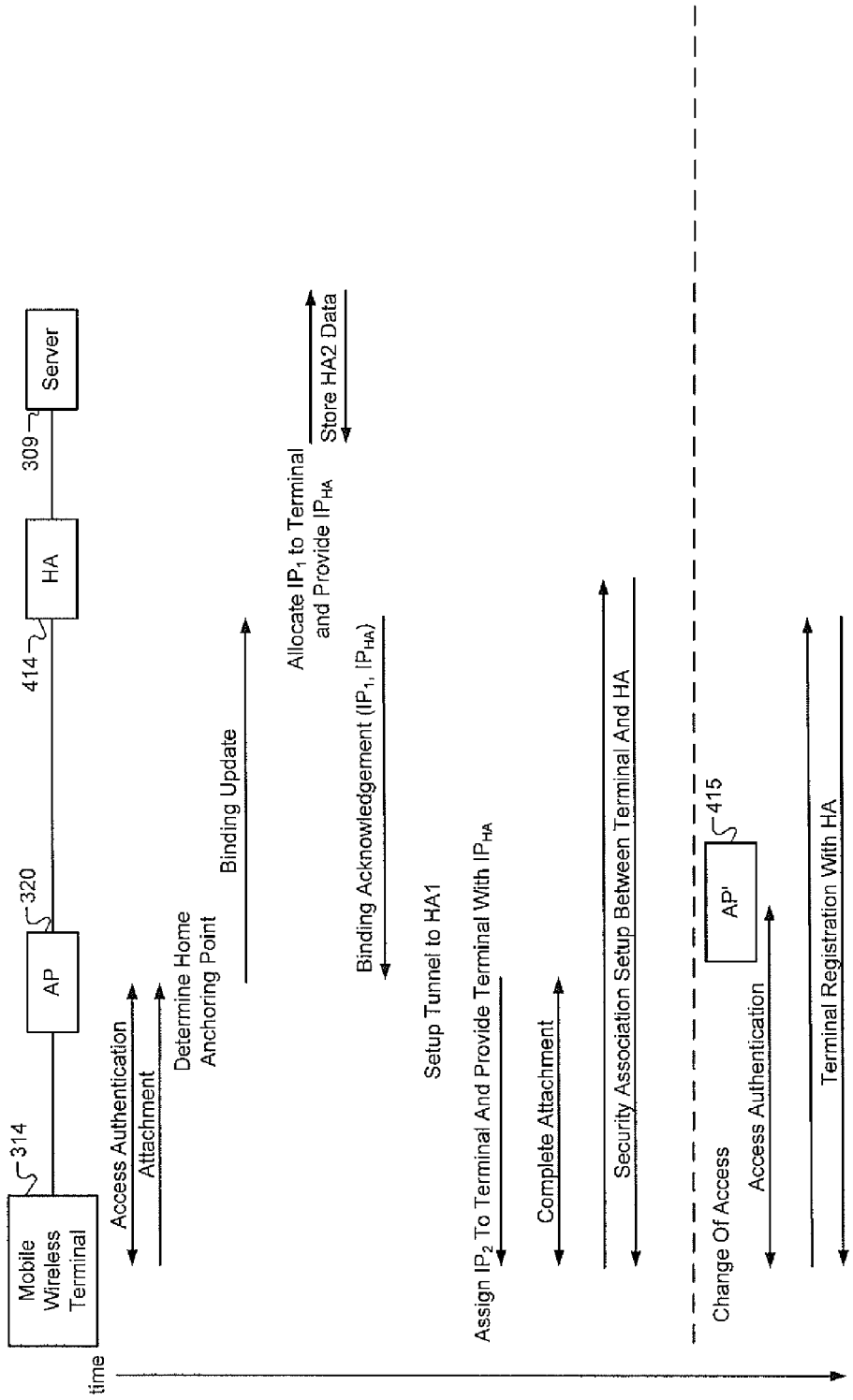
FIG. 9B is an exemplary timeline of network system operations according to the present disclosure.

Referring now to FIG. 9B, an exemplary timeline of steps performed when the wireless terminal 314 connects to a network is presented. First, the wireless terminal 314 performs access and authentication with the attachment point 320. This may include communicating with an AAA server. Upon authentication, the wireless terminal 314 attempts to attach to the attachment point 320. The mobile terminal 314 may request a public address from an anchoring point in the home network during access and authentication.

The mobile terminal 314 may also provide selection data during authentication and/or attachment that indicates that the mobile terminal 314 prefers a HA that is capable of terminal based mobility. In other words, the mobile terminal 314 may provide an indication of the type of IP mobility management desired for handover between accesses when the mobile terminal is roaming. Examples of mobility management protocols include Common Management Information Protocol (CMIP), proxy mobile IP (PMIP) and General Packet Radio Service Tunneling Protocol (GTP).

For example, the mobile terminal 314 may include a profile that indicates that the mobile terminal 314 is capable of mobility. The mobile terminal 314 may generate the selection data based on the profile. Alternatively, the mobile terminal 314 may track historical data of terminal mobility and generate the selection data based on the historical data. The historical data may be tracked based on a predetermined time period or based on the life of the mobile terminal 314.

Alternatively, the mobile terminal 314 may include a selection device, such as a button, switch, button sequence or other input device, that allows selection of mobility for the mobile terminal 314. The selection data may be based on selection device inputs.

The AAA server may use an identifier of the wireless terminal 314, such as a network address identifier, that uniquely identifies the wireless terminal 314. The attachment request requests the public IP address from the attachment point 320. The attachment point 320 may determine the appropriate HA, such as HA 414, for the wireless terminal 314.

HA 414 may receive the selection data from the mobile terminal 314 and may determine whether the requested IP mobility management, such as GTP, is supported. If supported, HA 414 selects the public HA address (IP$_{HA}$) that may be made "visible" to the mobile terminal 314, and thus the mobile terminal 314 may directly address HA 414 based on IP$_{HA}$. Previously, terminals were not provided with public HA addresses and therefore did not directly address HAs when roaming. Instead, the terminals would initiate attachment steps for new access in a new network. HA 414 may also allocate an address, IP$_1$, to the mobile terminal 314. HA 414 may store IP$_1$ in a mapping of allocated IP addresses. HA 414 may send a binding acknowledgement that includes IP$_1$ and/or IP$_{HA}$, to attachment point 320. A tunnel is then set up between the attachment point 320 and the HA 414 for transmission of packets to and from the wireless terminal 314.

The attachment point 320 may then assign the address IP$_1$ to the mobile terminal 314 and also provide the mobile terminal 314 with IP$_{HA}$. In other words, HA 414 returns the public address, IP$_{HA}$, to the mobile terminal 314 as part of a network-based mobility management procedure.

The first network access of the mobile terminal 314 may provide IP$_{HA}$, to the mobile terminal 314, thereby anchoring mobility and IP connectivity between the mobile terminal 314 and HA 414. The mobile terminal 314 and HA 414 may setup security features so that the mobile terminal 314 may communicate securely with HA 414 without requiring, for example, standard AAA communications. The security features may be arranged though the AAA server 310. Alternatively, HA 414 may be associated with a network security module (not shown) that implements the security features based on requests from HA 414.

The mobile terminal 314 may use IP$_{HA}$ to designate HA 414 for host-based mobility when initiating a second access to a network. For example, the mobile terminal 314 may roam to a second visited network and may therefore lose attachment to the first visited network 318. The mobile terminal 314 may then attach to another attachment point 415 in a second network. Alternatively, the mobile terminal 314 may not lose connection to HA 414, but instead the attachment point 320 may handoff communications to the attachment point 415. Following attachment, the mobile terminal 314 may register with HA 414 using IP$_{HA}$. The mobile terminal 314 therefore may avoid discovery of a home network HA through the second visited network, as was previously required, because it can designate a specific HA.

Figure 10A:
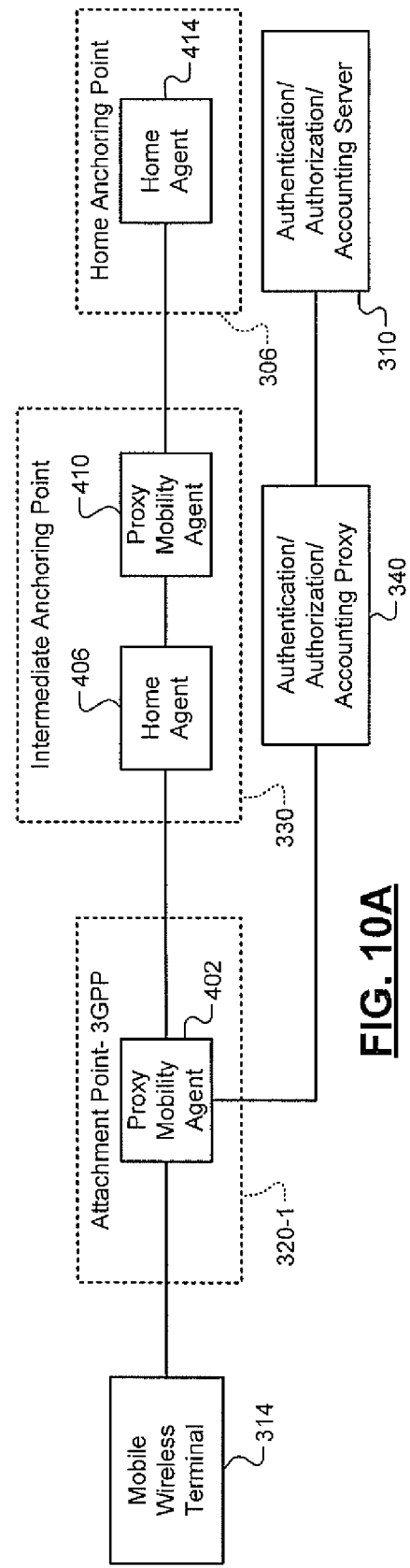
FIG. 10A is a functional block diagram of an exemplary implementation of hierarchical proxy mobility for a single attachment point according to the present disclosure.

Referring now to FIG. 10A, in an alternative embodiment, the mobile terminal 314 initially connects to a proxy mobility agent (PMA) 402 of the attachment point 320-1. In various implementations, the PMA 402 may be a part of a user plane entity (UPE), an access service network (ASN) gateway, and/or an electronic packet data gateway (ePDG). The PMA 402 receives identification information from the mobile terminal 314.

This identification information may include, for example, a Network Address Identifier (NAI) and/or an International Mobile Subscriber Identity (IMSI). The identification information is sent to the AAA proxy 340. Based on the identification information, the AAA proxy identifies the appropriate AAA server. In this case, the AAA server 310 is selected. The AAA proxy 340 sends the identification information to the AAA server 310, which returns authentication information to the PMA 402.

The mobile terminal 314 may also provide a public IP address for the ultimate home anchoring point, such as home anchoring point 306. The public address may be directly addressed by the mobile terminal 314 and may correspond to a specific home anchoring point. The attachment point 320-1 may recognize that the address corresponds to an anchoring point, such as the home anchoring point 306, and may route communications directly to the home anchoring point 306 without requiring authorization, authentication, etc.

Otherwise, assuming that the mobile terminal 314 is authorized for access, the PMA 402 sends a binding update to a HA 406 of the intermediate anchoring point 330. The PMA 402 also transmits information indicating that the HA 406 is not the ultimate HA of the mobile terminal 314. For example, the binding update may include information designating the ultimate HA of the mobile terminal 314, which is not the HA 406. The PMA 402 may be pre-programmed with the location of the HA 406.

In various implementations, the mobile terminal 314 and/or the AAA server 310 may provide information identifying the ultimate HA, such as the HA 414 of the home anchoring point 306. The PMA 402 and/or the HA 406 may also resolve the ultimate HA identification into an address, such as an IP address. In various implementations, the address of the ultimate HA may be resolved from a logical name using a Domain Name System (DNS) query. However, the mobile terminal 314 may provide the public IP address of the ultimate HA, thus removing need to resolve the address of the HA.

The HA 406 allocates an IP address for the mobile terminal 314, which may be performed in the same manner as when the HA 406 is the ultimate HA. However, because the HA 406 is not the ultimate HA, the HA 406 triggers a second PMA 410 of the intermediate anchoring point 330 to contact the ultimate HA, which may be HA 414. The second PMA 410 sends a binding update to the second HA 414. The second HA 414 may allocate an IP address, IP$_2$, to the mobile terminal 314. The second HA 414 may also allocate a public IP address (IP$_{HA2}$) for the home anchoring point 306.

The mobile terminal 314 may use IP$_{HA2}$ to connect with the home anchoring point 306 without requiring authorization, authentication, etc. The address IP$_2$ from the second HA 414 may also be assigned to the mobile terminal 314. Tunnels may then be established between the second HA 414 and the second PMA 410, and between the HA 406 and the PMA 402. Alternatively, tunnels may be established between the PMA 402 and the second HA 414.

Figure 10B:
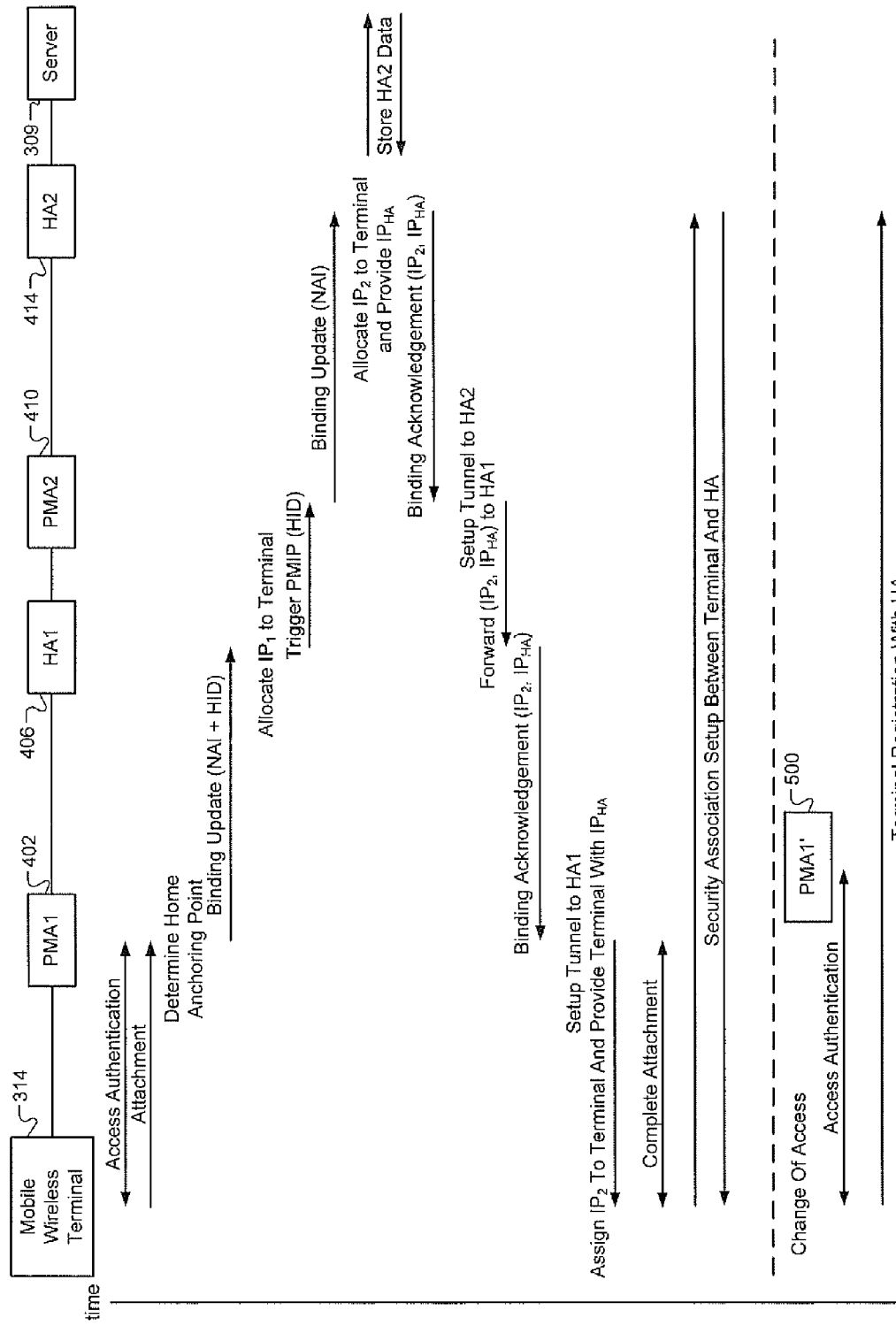
FIG. 10B is an exemplary timeline of network system operations according to the present disclosure.

Referring now to FIG. 10B, an exemplary timeline of a terminal attachment to a visited network is shown. For ease of explanation, the first PMA 402 will be referred to herein as PMA1 402, the second PMA as PMA2 410, the first HA 406 as HA1, and the second HA 414 as HA2. In an alternative embodiment, HA2 and PMA2 may correspond to the same entity. The mobile terminal 314 begins access authentication with PMA1 402. Assuming that authentication is successful, the mobile terminal 314 attempts to attach to PMA1 402. The mobile terminal 314 may provide selection data during authentication and/or attachment that indicates that the mobile terminal 314 prefers a HA that is capable of terminal based mobility. In other words, the mobile terminal 314 may provide an indication of the type of IP mobility management desired for handover between accesses when the mobile terminal 314 is roaming. Examples of mobility management protocols include CMIP, PMIP and GTP.

For example, the mobile terminal 314 may include a profile that indicates that the mobile terminal 314 is capable of mobility. The mobile terminal 314 may generate the selection data based on the profile. Alternatively, the mobile terminal 314 may track historical data of terminal mobility and generate the selection data based on the historical data. The historical data may be tracked based on a predetermined time period or based on the life of the mobile terminal 314.

Alternatively, the mobile terminal 314 may include a selection device, such as a button, switch, button sequence or other input device, that allows selection of mobility for the mobile terminal 314. The selection data may be based on selection device inputs. PMA1 402 may determine the ultimate home anchoring point of the mobile terminal 314 based on the selection data from the mobile terminal 314.

For example, PMA1 402 may select the ultimate home anchoring point based on the indication of the IP mobility management. Selection may be based on the ability of the ultimate home anchoring point to support the request for CMIP. PMA1 402 may select a private HA IP address from a plurality of HA addresses that corresponds to a home anchoring point, such as home anchoring point 306. The private IP address may be visible only to network entities and not to the mobile terminal 314. If no selection data is provided from the mobile terminal 314, PMA1 402 may determine the ultimate home anchoring point based on other criteria, such as home anchoring point availability. In various implementations, ultimate home anchoring point selection may occur during authentication.

PMA1 402 may send a binding update to HA1 406, which may include an identifier of the mobile terminal 314 and an identifier of the ultimate HA. These may be referred to as the network address identifier (NAI) and the HA identifier (HID), respectively. HA1 406 may allocate address $IP_1$ to the mobile terminal 314. Because HA1 406 has received the HID, HA1 406 instructs PMA2 410 to bind to the ultimate HA. PMA2 410 locates the ultimate HA based on the HID and/or the public address provided by the mobile terminal 314.

In various implementations, the binding update from PMA1 402 to HA1 406 may omit the HID. Therefore, HA1 406 may automatically determine what the ultimate HA of the mobile terminal 314 is. HA1 496 may use the NAI of the mobile terminal 314, a portion of the NAI, and/or the public HA address (for example, $IP_{HA2}$) provided by the mobile terminal 314 to look up the ultimate HA, such as with an AAA query. HA1 406 may then know whether it is the ultimate HA of the mobile terminal 314. Alternatively, the binding update may include an indication that HA1 406 is not the ultimate HA. This may prompt HA1 406 to determine the ultimate HA of the mobile terminal 314.

When HA1 406 determines that it is not the ultimate HA, it may trigger PMA2 410 to bind to the ultimate HA. HA1 406 may provide the address of the ultimate HA, or PMA2 410 may determine this information. For example, PMA2 may contact an AAA server and/or a DNS server using the HID. PMA2 410 may also merely bind to an ultimate HA based on the pubic HA address provided by the mobile terminal 314. PMA2 410 may send a binding update, which includes the NAI and/or the public HA address, to HA2 414. HA2 414 may allocate an address, $IP_2$, to the mobile terminal 314. HA2 414 may store $IP_2$ in a mapping of NAIs and allocated IP addresses. HA2 414 may receive the selection data from the mobile terminal 314 and may determine whether the requested IP mobility management, such as CMIP, is supported.

If supported, HA2 414 selects the public HA address ($IP_{HA2}$) that may be made "visible" to the mobile terminal 314, and thus the mobile terminal 314 may directly address HA2 414 based on $IP_{HA2}$. HA2 414 may send a binding acknowledgement that includes $IP_2$ and/or $IP_{HA2}$, to PMA2 410. PMA2 410 and HA2 414 may then set up a common tunnel. PMA2 410 may forward $IP_2$ and $IP_{HA2}$ to HA1 406. HA1 406 may then send a binding acknowledgment including $IP_2$ and/or $IP_{HA2}$ to PMA1 402. PMA1 402 and HA1 406 may set-up a common tunnel. PMA1 402 may then assign the address $IP_2$ to the mobile terminal 314 and provide the mobile terminal 314 with $IP_{HA2}$. In other words, HA2 414 returns the public address, $IP_{HA2}$, to the mobile terminal 314 as part of a network-based mobility management procedure.

The first network access of the mobile terminal 314 may provide $IP_{HA2}$, to the mobile terminal 314, thereby anchoring mobility and IP connectivity between the mobile terminal 314 and HA2 414. The mobile terminal 314 and HA2 414 may setup security features so that the mobile terminal 314 may communicate securely with HA2 414 without requiring, for example, AAA proxy communications. The security features may be arranged though the AAA server 310. Alternatively, HA2 may be associated with a network security module (not shown) that implements the security features based on requests from HA2 414.

The mobile terminal 314 may use $IP_{HA2}$ to designate HA2 414 for host-based mobility when initiating a second access to a network. For example, the mobile terminal 314 may roam to a second visited network and may therefore lose attachment to the first visited network 318. The mobile terminal 314 may then attach to a PMA (PMA1' 500) in the second network. Alternatively, the mobile terminal 314 may not lose connection to HA2 414, but instead PMA1 402 may handoff communications to PMA1' 500. Following attachment, the mobile terminal 314 may register with HA2 414 using $IP_{HA2}$. The mobile terminal 314 therefore may avoid discovery of a home network HA through the second visited network, as was previously required.

Figure 11A:
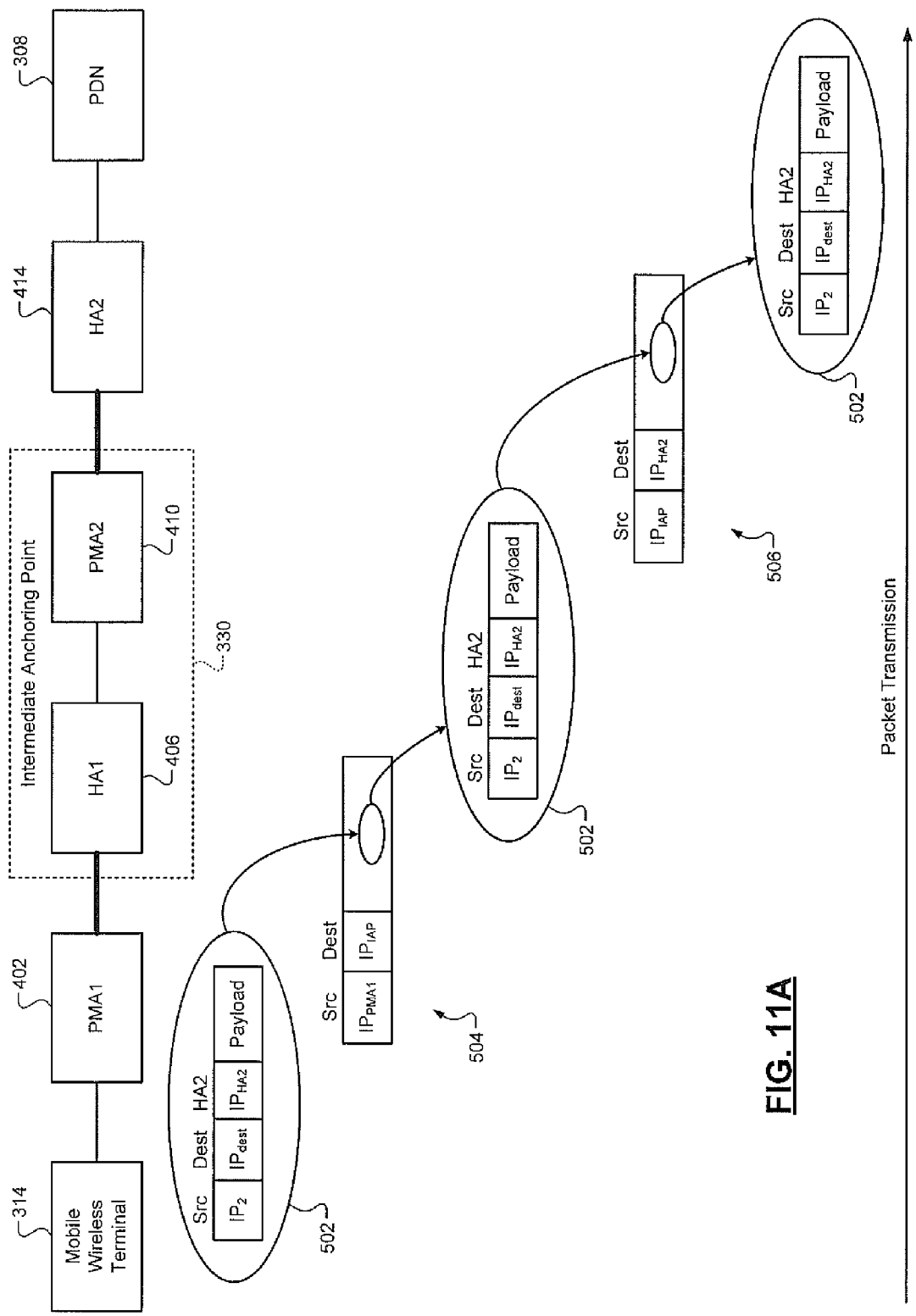
FIGS. 11A-12 are exemplary graphical depictions of transmission of a packet within a network system according to the present disclosure.

Referring now to FIG. 11A, a packet 502 is shown being transmitted by the mobile terminal 314. The packet 502 includes a source address of $IP_2$, which has been assigned to the mobile terminal 314. The destination address, which is routable from HA2, is denoted $IP_{dest}$. The packet 502 may also include an HA address, $IP_{HA2}$, that designates HA2 as an anchor point. The packet 502 may also include a payload. The packet 502 may initially be sent to PMA1 402. PMA1 402 encapsulates the packet 502 into a payload of a first encapsulating packet 504.

The first encapsulating packet 504 has a source address of PMA1 402, $IP_{PMA1}$, and a destination address of the intermediate anchoring point 330, $IP_{IAP}$. HA1 extracts the packet 502 from the first encapsulating packet 504. Based on the source address of the packet 502 and/or the HA2 address for the packet, PMA2 410 recognizes that the packet 502 should be passed to HA2 414.

PMA2 410 encapsulates the packet 502 into a second encapsulating packet 506. The second encapsulating packet 506 has a source address of $IP_{IAP}$ and a destination address of HA2 414, $IP_{HA2}$. Alternatively, a different address may be used to address HA2 414 from PMA2 410, which may be referred to as HA2', which may represent a private address for HA2 414. The private address may be used between network devices even when the public address $IP_{HA2}$ is used to designate HA2 414. However, network devices may recognize both public and private addresses from HA2 414 and may interchange the addresses. The mobile terminal 314, however, may only use and recognize $IP_{HA2}$. HA2 414 extracts the packet 502 from the second encapsulating packet 506 and forwards the packet 502 to the noted destination address, $IP_{dest}$. For example, $IP_{dest}$ may be within the PDN 308, within the home network, or within a visited network.

Figure 11B:
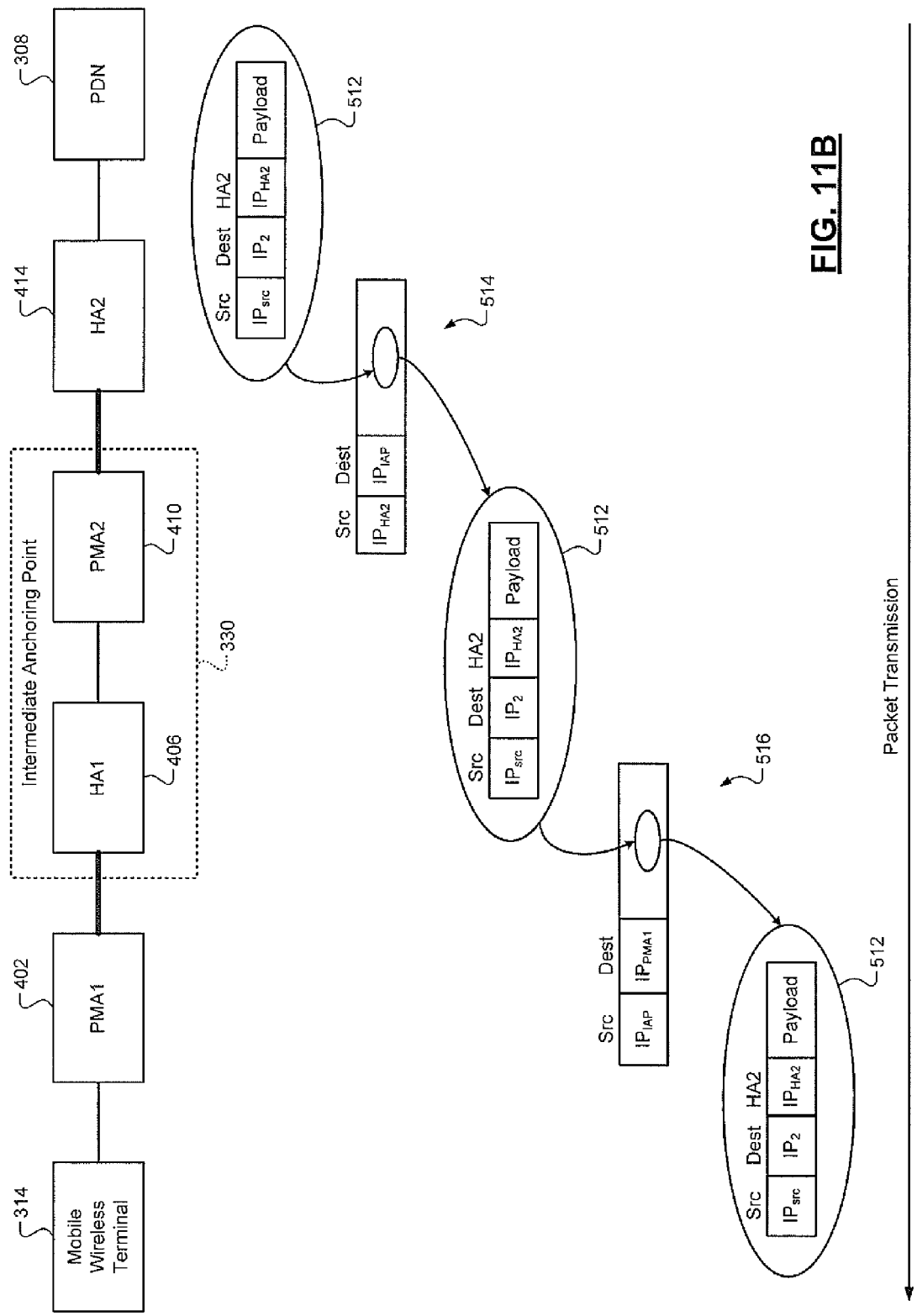

Referring now to FIG. 11B, a packet 512 being transmitted to the mobile terminal 314 is shown. The packet 512 may have a destination address of $IP_2$, which has been assigned to the mobile terminal 314. The packet 512 may also have a source address designated $IP_{src}$) and may include a payload. The packet 512 may also include a public address for HA2 414, $IP_{HA2}$. When HA2 414 receives packets with a destination address of $IP_2$, they are tunneled to the mobile terminal 314.

The packet 512 is therefore encapsulated in a payload of a first encapsulating packet 514. The first encapsulating packet 514 has a source address of $IP_{HA2}$ and a destination address of $IP_{IAP}$. PMA2 extracts the packet 512 from the first encapsulating packet 514. Because $IP_2$, the destination address of the packet 512, is associated with PMA1, PMA2 forwards the packet 512 to HA1 for tunneling to PMA1.

HA1 encapsulates the packet 512 into a payload of a second encapsulating packet 516. The second encapsulating packet 516 has a source address of $IP_{IAP}$ and a destination address of $IP_{PMA1}$. PMA1 receives the second encapsulating packet 516 and extracts the packet 512. The packet 512 is then forwarded to the destination address, $IP_2$, which has been assigned to the mobile terminal 314. The mobile terminal 314 may also extract the $IP_{HA2}$ from the packet for communications with the PDN 308. For example, packets may include a predetermined order for data, such as Src, Dest, HA2, and payload. When an IP address is in one of the positions, for example, the HA2 position, the mobile terminal 314 may determine that $IP_{HA2}$ corresponds to a public address of a home anchoring point. In FIGS. 11A-11B, PMA1 402 and the intermediate anchoring point 330 are used. However, alternative embodiments do not include intermediate anchoring point and merely include the mobile terminal 314 communicating with a HA via an attachment point.

Figure 12:
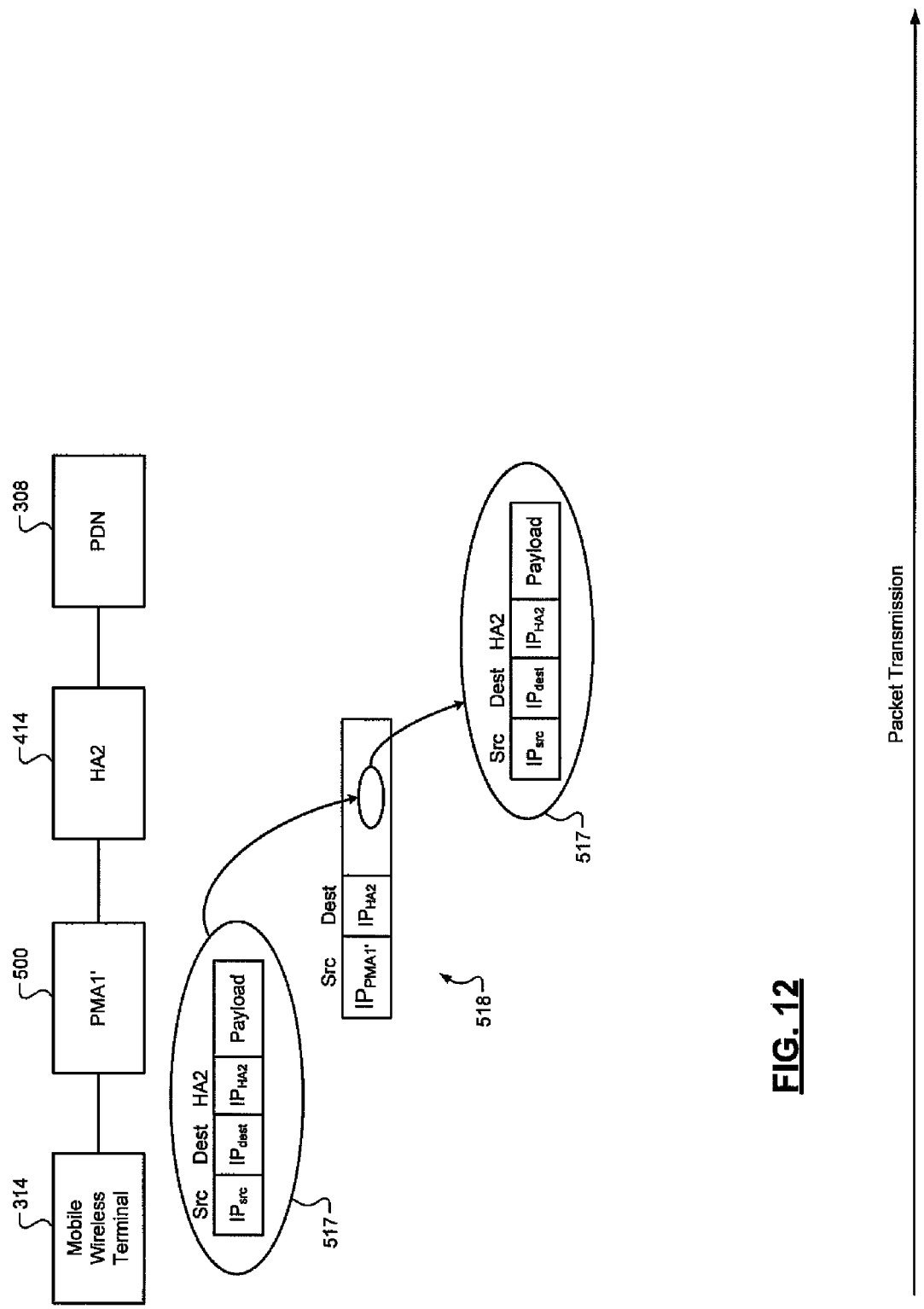

Referring now to FIG. 12, the mobile terminal 314 may roam to a different network or out of range of PMA1 402 and may attach to a different proxy mobility agent (for example, PMA1' 500). When the mobile terminal 314 has been provided with a public address for a home anchoring point, $IP_{HA2}$, the mobile terminal 314 may transmit a packet 517 that includes $IP_{HA2}$. The packet 517 may therefore be routed through HA2 instead of a different home anchoring point. The packet 517 may also include source and destination addresses ($IP_{src}$, $IP_{dest}$, respectively) and a payload.

Further, when the packet 517 includes a home anchoring point address, such as $IP_{HA2}$, PMA1' 500 may determine that the mobile terminal 314 does not require authorization and/or other steps required for initial attachments to a network. PMA1' 500 may encapsulate the packet 517 in an encapsulating packet 518 that includes a source address for PMA1' ($IP_{PMA1'}$) and $IP_{HA2}$, which corresponds to the home anchoring point destination for the packet 517. PMA 1' 500 may also determine the ultimate destination of the packet 517 based on the destination address, $IP_{dest}$. HA2 extracts the packet 517 from the encapsulating packet 518, and forwards the packet 517 to the noted destination address, $IP_{dest}$. For example, $IP_{dest}$ may be within the PDN 308, within the home network, or within a visited network.

Referring now to FIGS. 13A-13D, functional block diagrams of exemplary network devices of the network system 300 are shown. The attachment point 320 may include a RAN, a WLAN, a WiMAX network, a cellular network, etc. The home network server(s) 309 may include a HSS, an AAA server, a remote server, etc. The mobile terminal 314 may provide the attachment point 320 with service request information, IP connectivity protocol information, PDN information, and/or HA information. The mobile terminal 314 may communicate with the home network server(s) 309 via the attachment point 320 and/or an intermediate anchoring point 330 to setup connectivity and mobility tunnel(s). The mobile terminal 314 may use the connectivity and mobility tunnel(s) for communication between the mobile terminal 314 and the home anchoring point 306. The tunnel(s) may include a connectivity tunnel and/or a mobility tunnel.

The mobile terminal 314 may include an antenna 520, an analog front-end module 522, a transmit module 524, a receive module 526, and a control module 528. The analog front-end module 522 may transmit signals generated by the transmit module 524 via the antenna 520 and may output signals received from the antenna 520 to the receive module 526. The mobile terminal 314 may also include an IP connectivity generator 530 for the generation of IP descriptors and/or IP connectivity indicators. An IP connectivity generator may be included in one of the other network devices, such as in the attachment point 320, the intermediate anchoring point 330, the home anchoring point 306, etc.

Figure 13A:
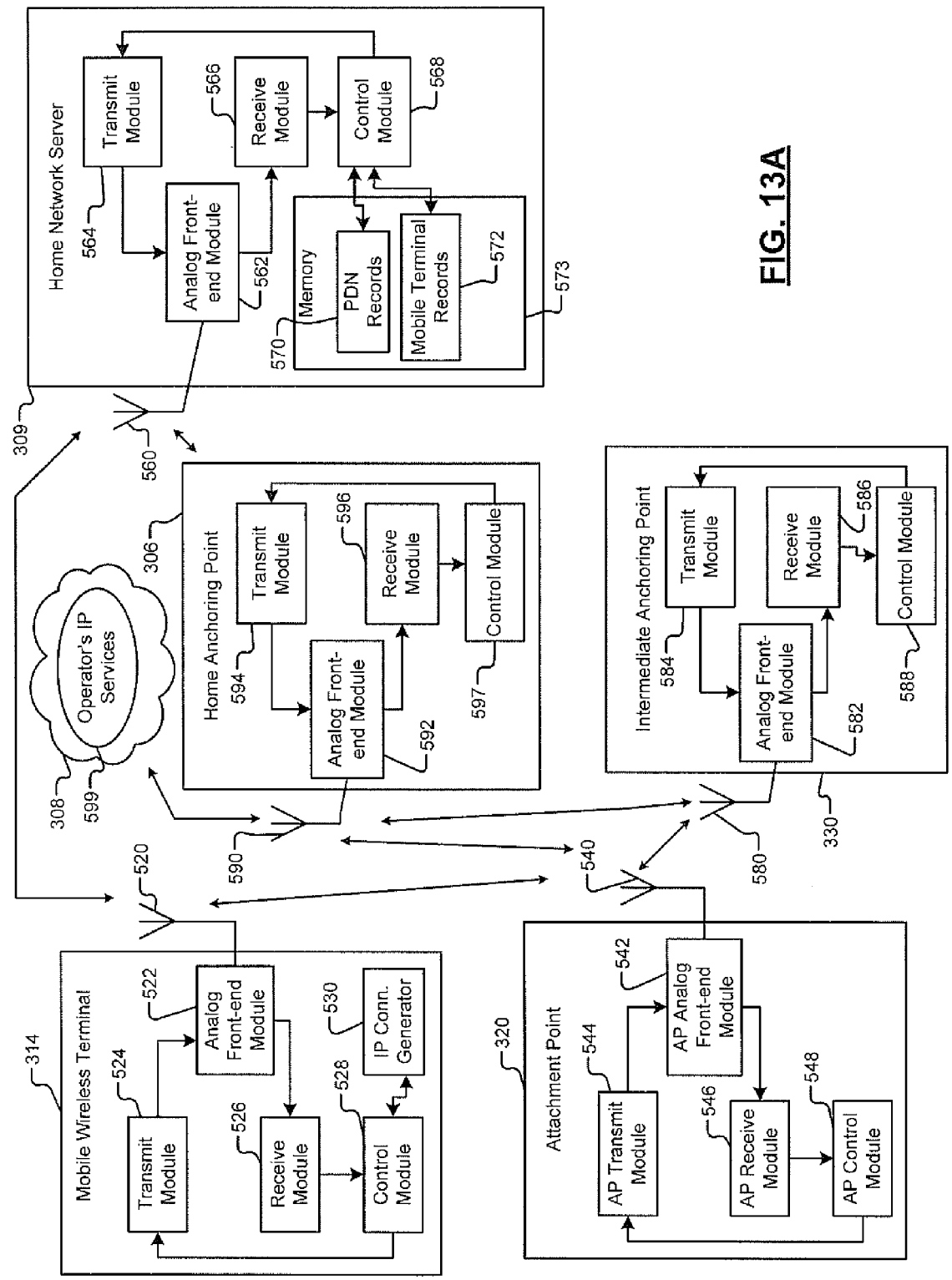
FIGS. 13A-13D are functional block diagrams of network devices according to the present disclosure.
Figure 13B:
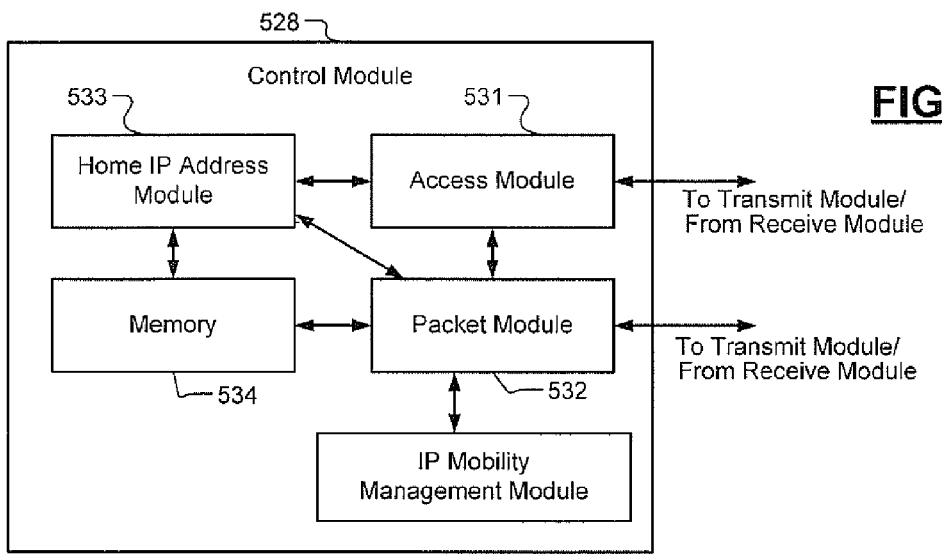

In FIG. 13B, the control module 528 may include an access module 531 that initiates access with an attachment point of an external network, such as the visited network 318. If the mobile terminal 314 roams outside of the range of the attachment point and/or the visited network, the access module 531 may initiate access communications with a new attachment point and/or network. The control module 528 may also include a packet module 532 that constructs, sends and receives packets.

The packet module 532 may also determine the contents of a packet, such as the packet 512 of FIG. 11B. A home IP address module 533 may determine whether the packet 512 includes an IP address for the home anchoring point and may store the IP address in memory 534. The packet module 532 and the access module 531 may use the identified IP address in subsequent communications. The control module 528 may also include a mobility management module 535. The mobile terminal 314 may select between host based and network based mobility, including CMIP, PMIP, and/or GTP when roaming.

The attachment point 320 may include an antenna 540, an analog front-end module 542, a transmit module 544, a receive module 546, and a control module 548. The control module 548 may correspond to a proxy mobile agent 402. The analog front-end module 542 may transmit signals generated by the transmit module 544 via the antenna 540 and may output signals received from the antenna 540 to the receive module 546.

Figure 13C:
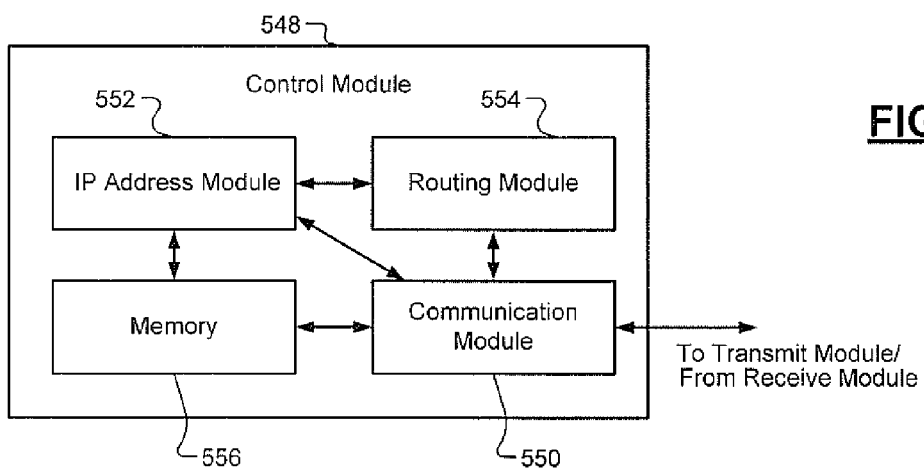

In FIG. 13C, the control module 548 may include a communication module 550 that receives and analyzes access requests from mobile terminals and packets from mobile terminals and external networks. The access requests and/or the packets may include a public IP address for a home anchoring point. An IP address module 552 may determine that the terminal sent a packet and/or an access request that includes the public IP address of the home anchoring point and may route communications via a routing module 554 from the terminal directly to the home anchoring point based on the public IP address. The IP address module 552 may determine that the IP address corresponds to an IP address of a home anchoring point by comparing the IP address to IP addresses for various anchoring points stored in memory 556.

The home network server(s) 309 may include an antenna 560, an analog front-end module 562, a transmit module 564, a receive module 566, and a control module 568. The analog front-end module 562 may transmit signals generated by the transmit module 564 via the antenna 560 and may output signals received from the antenna 560 to the receive module 566. The home network server(s) 309 may include PDN records 570 and mobile terminal records 572 stored within memory 573.

The intermediate anchoring point 330 may include an antenna 580, an analog front-end module 582, a transmit module 584, a receive module 586, and a control module 588. The control module 588 may correspond to a home agent 406 and/or a proxy mobile agent 410. The analog front-end module 582 may transmit signals generated by the transmit module 584 via the antenna 580 and may output signals received from the antenna 580 to the receive module 586.

The home anchoring point 306 may include an antenna 590, an analog front-end module 592, a transmit module 594, a receive module 596, and a control module 597. The control module 597 may correspond to a proxy home agent 414. The analog front-end module 592 may transmit signals generated by the transmit module 594 via the antenna 590 and may output signals received from the antenna 590 to the receive module 596. The home anchoring point 306 may be in communication with a PDN 308 that provides operator IP services 599.

Figure 13D:
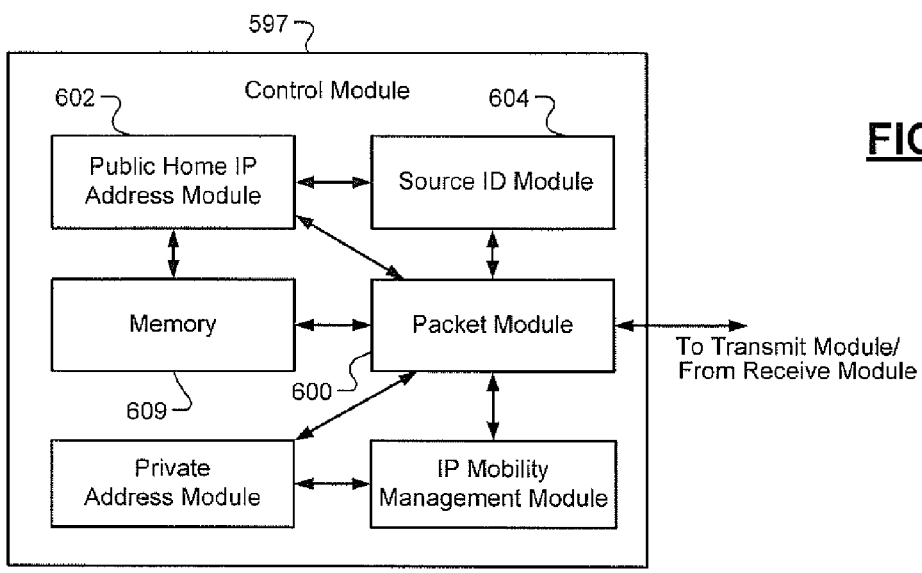

In FIG. 13D, the control module 597 may include a packet module 600 that transmits and receives packets with external network devises via the transmit/receive modules 594, 596. The control module 597 may include a public home IP address module 602 that provides a public IP address (for example $IP_{HA}$) that is included with the packets that are transmitted externally. The control module 597 may also include a source analysis module 604 that determines that a particular mobile terminal sent a packet. The public home IP address module 602 may provide a different public IP address for different terminals based on source analysis module signals. The control module 597 may store profiles for terminals in memory 609 and/or may receive profile data for terminals from a memory within a home network server 309.

The control module 597 may also include a private address module 610 that recognizes requests to use the home anchoring point 306 from devices in the network system 300, such as the intermediate anchor point 330. The requests may include a private address for the home anchoring point 306. The private address may be visible to network devices, such as the home network server 309 and the intermediate anchoring point 330 but may be invisible to mobile terminals. In other words, mobile terminals may not directly address the home anchoring point 306 using a private address for the home anchoring point 306. An IP inability management module 610 may receive communications from network devices that are addressed using the private address.

The communications may include requests to connect from the mobile terminal 314 and my also include an indication of a mobility management selection or preference from the mobile terminal 314. The IP mobility management module 610 may determine whether the selected mobility (for example, host or network mobility) is supported by the home anchoring point 306. If it is, the home anchoring point 306 may provide the public IP address to the mobile terminal 314. Otherwise, devices in the network 300 may select a different home anchoring point and/or the home anchoring point 306 may refuse to accept communications with the mobile terminal 314.

The embodiments disclosed herein enable a mobility mode. The mobility mode refers to the ability of a mobile terminal to roam between local and/or global networks. The mobility mode is setup based on mobile terminal and network system mobility capabilities, mobility preferences, and mobile terminal profiles and may refer to selected inability protocols for IP connectivity and handoff, as well as a selected home anchoring point 306. The decision to operate in a mobility mode may be made by a home network, and may change based on updated mobile terminal parameters and/or network system parameters.

When the connectivity protocol is host-based, the control module may set up the connectivity tunnel between the mobile terminal 314 and the attachment point 320 of a remote network using a host-based protocol (for example, CMIP). For example, the attachment point 320 may respectively function as an access router when the CMIP is MIPv4 or MIPv6, which are incorporated herein in their entirety.

When the connectivity protocol is network-based, the attachment point 320 may set up the connectivity tunnel between the mobile terminal 314 and the attachment point 320 and/or between the attachment point 320 and an intermediate anchoring point 330 using a network-based protocol (for example, PMIP).

Figure 14:
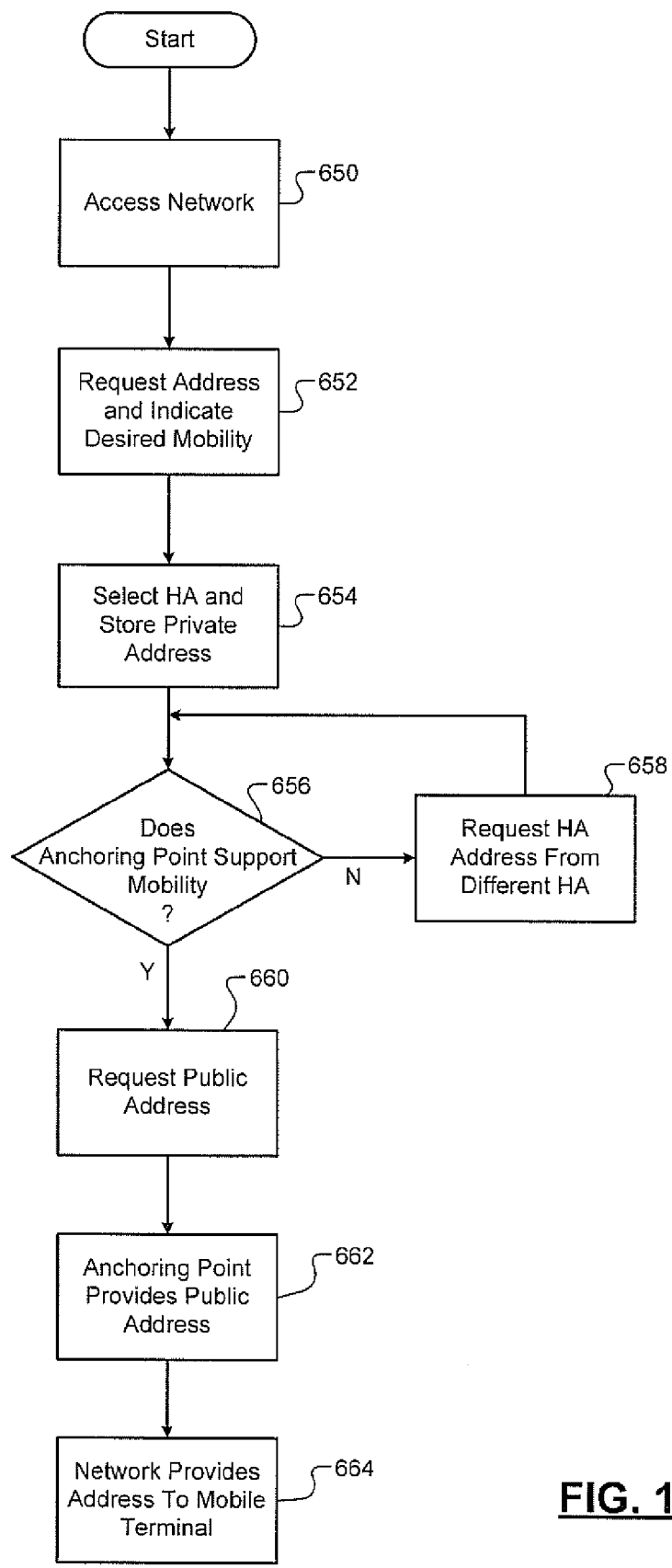
FIG. 14 is a flowchart depicting exemplary steps performed for a method for allocating an anchoring point according to the present disclosure.

The mobile terminal 314 may communicate with a remote network via the mobility tunnel when the mobile terminal 314 roams from, for example, one local network to another (for example, from a WLAN to a cellular network). The intermediate anchoring point 330 may handoff a mobility tunnel from one local network to another when the mobile terminal 314 roams between local networks. Referring now to FIG. 14 a flowchart depicts exemplary steps performed by the mobile terminal. Control begins in step 650 when a mobile terminal 314 attempts to gain access connectivity with the network 302 at the access level. For example, the mobile terminal 314 may perform an Evolved Universal Terrestrial Radio Access Network (eUTRAN) network attachment. Alternatively, the mobile terminal 314 may trigger a network parameter configuration using Neighbor Discovery mechanisms or a Dynamic Host Configuration Protocol (DHCP).

In step 652, the mobile terminal 314 may provide an indication of the type of IP mobility management desired, for example, CMIP, PMIP, or GTP, for handover between accesses. The mobile terminal 314 may also request a public address that corresponds to a home anchoring point within the home network. In step 654, a home anchoring point is selected in the home network 302 for a particular PDN by a network device, for example, an attachment point, such as PMA 410. The PDN and/or home anchoring point may be selected based on the indication of the mobility management from the mobile terminal 314 to, for example, support the request for CMIP, PMIP, or GTP. Devices within the network, such as PMA 410, may use a private address to communicate and/or select the selected home anchoring point based on the request from the mobile terminal 314. The selected home anchoring point may interact with the HSS/AAA to store the private address.

In step 656, if the selected home anchoring point does not support the desired mobility, a network device, such as PMA 410, for example, may select a different home anchoring point in step 658. Otherwise, in step 660, the home anchoring point is provided with the request from the mobile terminal 314 for a public address for the home anchoring point. The home anchoring point then selects a public address, which is the address that can be made visible to the mobile terminal 314 and that can be addressed directly by the mobile terminal 314. The home anchoring point therefore ultimately receives the request for the public address from the mobile terminal 314 and responds by generating or otherwise selecting a public address.

In step 662, the home anchoring point returns its public address to the access network as part of network-based mobility management procedures. The access network, which may be the home or visited network 302, 318 provides to the mobile terminal 314 the public address. The mobile terminal 314 thus has a public address of the core network element anchoring the mobility and the IP connectivity. The mobile terminal 314 may then, for example, use the public address as the home agent for the home anchoring point for host-based mobility when moving to another access using host-based mobility.

Figure 15:
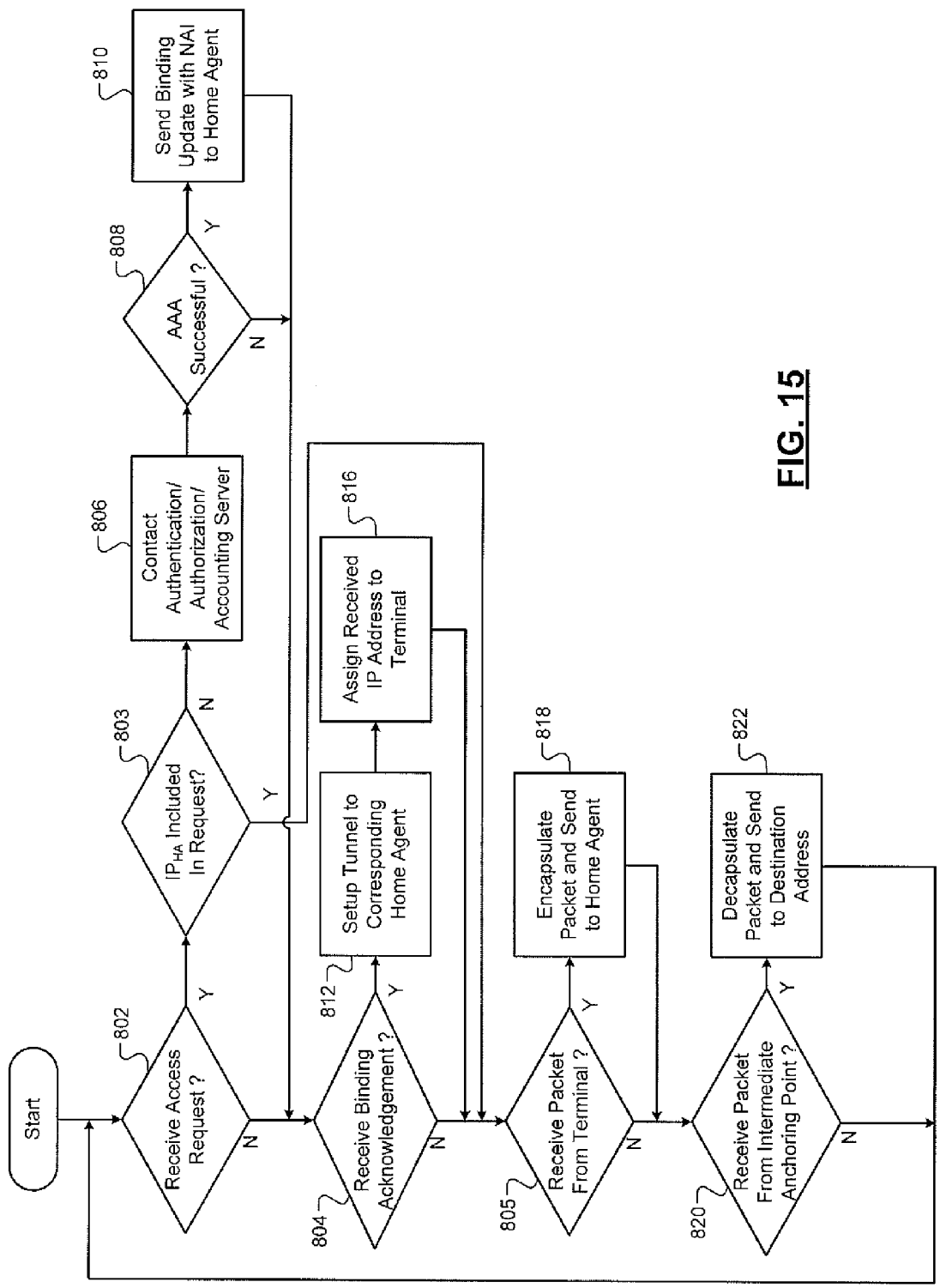
FIG. 15 is a flowchart depicting exemplary steps performed by an attachment point according to the present disclosure.

Referring now to FIG. 15, a flowchart depicts exemplary steps performed by the first PMA 402 when the mobile terminal 314 is roaming in a visited network. Control begins in step 802, where control determines where an access request has been received. If so, control transfers to step 803; otherwise, control transfers to step 804. In step 803, control determines whether the access request includes a public IP address ($IP_{HA2}$). If so, control transfers to step 805. If not, control transfers to step 806; otherwise, control transfers to step 804. In step 806, control contacts an AAA server to determine whether the terminal is authorized to attach. Control continues in step 808.

In step 808, if the AAA process determines that the terminal is authorized to attach, control continues in step 810; otherwise, control transfers to step 804. In step 810, control sends a binding update with the network address identifier of the terminal to the intermediate anchoring point. Control then continues in step 804.

In step 804, control determines whether a binding acknowledgement has been received. If so, control transfers to step 812; otherwise, controls transfers to step 805. In step 812, control sets up a tunnel to the HA 406 from which the binding acknowledgement was received. The HA may be located in the intermediate anchoring point 330, and may share an IP address with the intermediate anchoring point 330. Control then continues in step 816, where the address received in the binding acknowledgement is assigned to the mobile terminal 314. Control then continues in step 805.

In step 805, control determines whether a packet has been received from a mobile terminal 314. If so, control transfers to step 818; otherwise, control transfers to step 820. In step 818, control encapsulates the packet and sends the encapsulated packet to the HA 406 in the intermediate anchoring point 330 if $IP_{HA2}$ is not provided by the mobile terminal 314. Alternatively, control sends the packet to the HA 414 in the home anchoring point 306 if $IP_{HA2}$ is provided by the mobile terminal 314.

Control then continues to step 820. In step 820, control determines whether a packet has been received from the intermediate anchoring point 330. If so, control transfers to step 822; otherwise, control returns to step 802. In step 822, control decapsulates the packet and sends the packet to the destination address. The destination address will likely be that of the terminal. Control then returns to step 802.

Figure 16:
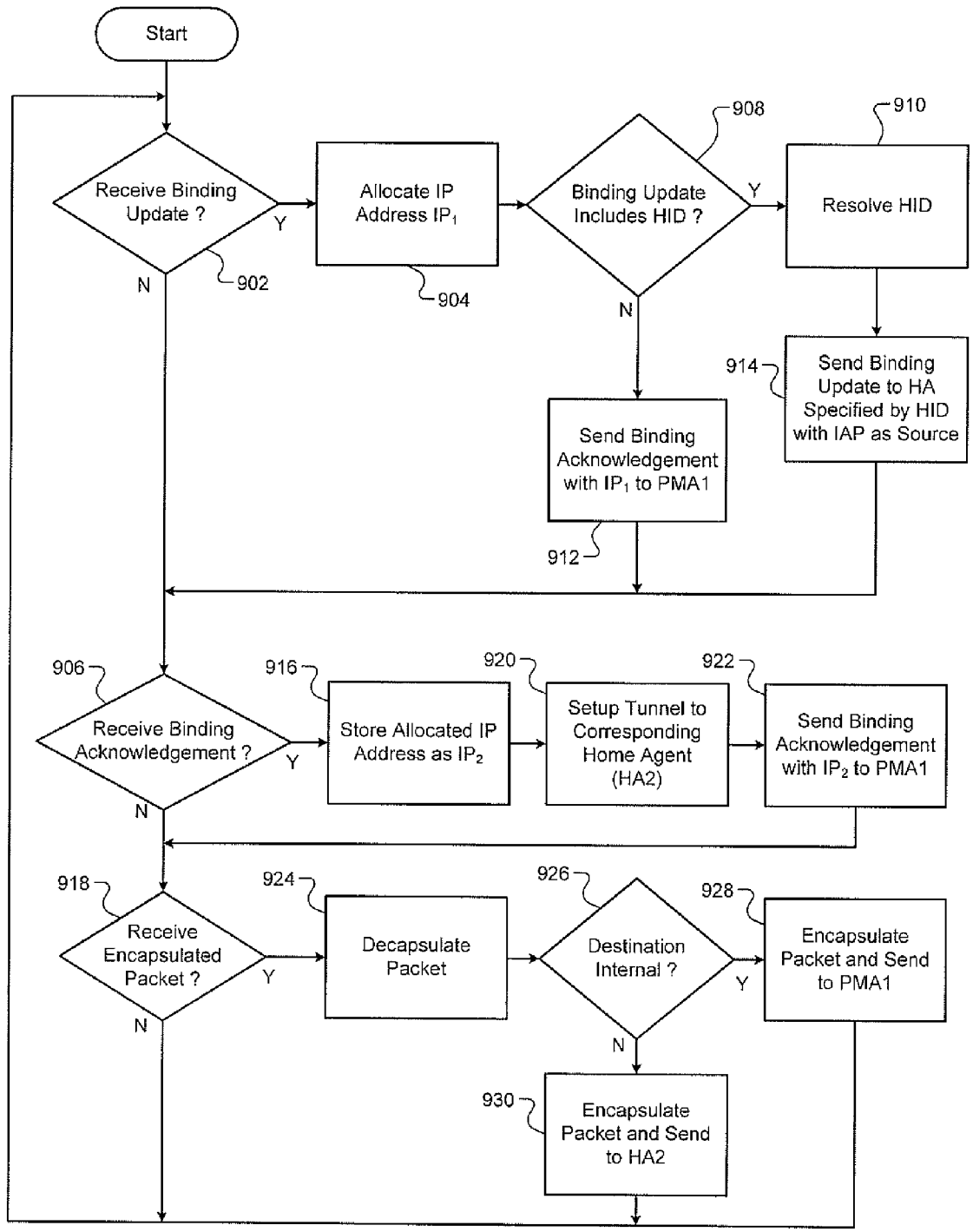
FIG. 16 is a flowchart depicting exemplary steps performed by an intermediate anchoring point according to the present disclosure.

Referring now to FIG. 16, a flowchart depicts exemplary steps performed by the intermediate anchoring point 330. Control begins in step 902, where control determines where a binding update has been received. If so, control transfers to step 904; otherwise, control transfers to step 906. In step 904, control may allocate an IP address, $IP_1$, to the mobile terminal 314 that triggered the binding update.

Control then continues in step 908, where control determines whether the binding update includes an NAI. If so, control transfers to step 910; if not, control transfers to step 912. An NAI may indicate that the ultimate HA is not in the intermediate anchoring point 330. The NAI may be based on, for example, the presence of a public IP address for a HA in communications from the mobile terminal 314. Therefore, in step 910, control determines the address of the ultimate HA.

For example, control may provide the NAI to an AAA server to determine the ultimate HA address. Alternatively, control may extract the IP address for the ultimate HA from a received packet from the mobile terminal 314. The intermediate anchoring point 330 may serve as a HA in addition to providing hierarchical proxy mobility between a proxy mobility agent and another HA.

The NAI may include a HID, which may include a logical name or network address for the ultimate HA. The HID may be based on the $IP_{HA2}$ provided by the mobile terminal 314 and/or by the ultimate HA 414. Control may resolve a logical name into a network address, such as by using a DNS query. The HID may already include the network address when the PMA sending the binding update has already performed this resolution.

Control continues in step 914, where a binding update is sent to the ultimate HA, which may have been identified by an HID. The binding update may be sent with a source address of the address of the intermediate anchoring point 330, such as shown in FIG. 11A. Alternatively, the binding update may be sent with a source address of the allocated address, $IP_1$, such as is shown in FIG. 12A. Control then continues in step 906.

In step 912, the intermediate anchoring point 330 is the ultimate HA, and so a binding acknowledgement is returned to the first PMA 402, PMA1, including the allocated address, $IP_1$. Control continues in step 906. In step 906, control determines whether a binding acknowledgement has been received. If so, control transfers to step 916; otherwise, control transfers to step 918.

In step 916, control stores the received IP address as $IP_2$. Control may create a table entry matching $IP_2$ with the PMA that originated the binding process. Control continues in step 920, where control sets up a tunnel between PMA2 410 and the sender of the binding acknowledgement, HA2 414. Control continues in step 922, where control sends a binding acknowledgment including $IP_2$ to PMA1 402. Controls continue in step 918.

In step 918, control determines whether an encapsulated packet has been received. If so, control transfers to step 924. Otherwise, control returns to step 902. In step 924, the packet is decapsulated. Control continues in step 926, where control determines if the destination of the packet is a terminal connected within the visited network. If so, control transfers to step 928; otherwise, control transfers to step 930. In step 926, control may check if the packet destination is any of the IP addresses, such as $IP_2$, assigned to terminals connected to the intermediate anchoring point 330.

In step 928, control encapsulates the packet and sends it to the appropriate PMA. Control then returns to step 902. In step 930, control encapsulates the packet and sends the packet to the appropriate HA, which is HA2 414 in this example. Control then returns to step 902.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first network configured to connect a terminal to a home network during a time that the terminal is roaming within the first network, the first network comprising:
    a plurality of attachment points, wherein a first attachment point of the plurality of attachment points includes a first interface selected from a group consisting of a 3GPP interface, a 3GPP2 interface, a WiMAX interface, a WLAN interface, and a wired interface, wherein the first attachment point is configured to receive an attach request from the terminal, and wherein the attach request includes a request from the terminal for an Internet Protocol (IP) address from an anchoring point within the home network; and an Authentication/Authorization/Accounting server proxy configured to determine whether the terminal is authorized to attach to the first attachment point, wherein in response to the terminal being authorized to attach to the first attachment point, i) a first tunnel is created between the first attachment point and a second attachment point of the plurality of attachment points, wherein the second attachment point includes a gateway to permit one or more of the plurality of attachment points to communicate with other networks including the home network, and wherein the second attachment point includes switching and routing functionality to permit one or more of the plurality of attachment points to communicate with each other; and ii) a second tunnel is created between the second attachment point and the anchoring point within the home network, wherein the first attachment point is configured to initially receive the Internet Protocol (IP) address from the anchoring point within the home network via i) the first tunnel between the first attachment point and the second attachment point and ii) the second tunnel between the second attachment point and the anchoring point within the home network, and wherein in response to the terminal switching from the first attachment point to a third attachment point of the plurality of attachment points, wherein the third attachment point includes a second interface selected from the group consisting of the 3GPP interface, the 3GPP2 interface, the WiMAX interface, the WLAN interface, and the wired interface, and wherein the third attachment point is separate from the first attachment point and the second attachment point, the second tunnel between the second attachment point and the anchoring point within the home network remains unchanged.

2. The first network of claim 1, wherein the first network comprises a visited network.

3. The first network of claim 2, wherein the visited network comprises a visited public land mobile network (VPLMN) of a 3GPP network system.

4. The first network of claim 1, wherein the Authentication/Authorization/Accounting server proxy is configured to determine what services the terminal should be offered in response to the first attachment point receiving the attach request.

5. The first network of claim 1, wherein the Authentication/Authorization/Accounting server proxy is configured to determine what quality of service should be guaranteed to the terminal in response to the first attachment point receiving the attach request.

6. The first network of claim 1, wherein the Internet Protocol (IP) address received from the anchoring point within the home network comprises:

a public Internet Protocol (IP) address that designates the anchoring point within the home network.

7. The first network of claim 1, wherein:

during authentication of the terminal, the terminal is configured to provide, to the anchoring point within the home network, an indication of a type of IP mobility management desired for handover between accesses while the terminal is roaming.

8. The first network of claim 7, wherein the type of IP mobility management comprises one or more of: Common Management Information Protocol (CMIP), proxy mobile IP (PMIP), and General Packet Radio Service Tunneling Protocol (GTP).

* * * * *